(12) United States Patent
Satoh et al.

(10) Patent No.: US 6,483,314 B2
(45) Date of Patent: Nov. 19, 2002

(54) SYSTEM FOR MONITORING AIRPORT LAMPS

(75) Inventors: Takakazu Satoh, Fuchu (JP); Hidenori Gotoh, Matsudo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/768,249

(22) Filed: Jan. 25, 2001

(65) Prior Publication Data

US 2001/0038288 A1 Nov. 8, 2001

(30) Foreign Application Priority Data

Jan. 27, 2000 (JP) .......................... 2000-018891
Jun. 9, 2000 (JP) .......................... 2000-174059

(51) Int. Cl.[7] .................. G01R 31/00; H04M 11/04
(52) U.S. Cl. ....................... 324/414; 340/310; 340/1
(58) Field of Search ................. 324/414; 340/310.01, 340/310.02; 307/90; 375/340

(56) References Cited

U.S. PATENT DOCUMENTS 5,475,360 A * 12/1995 Guidette et al. ....... 340/310.01
5,691,691 A * 11/1997 Merwin et al. ............. 307/90
6,014,386 A * 1/2000 Abraham ............... 340/310.01

* cited by examiner

Primary Examiner—N. Le
Assistant Examiner—James Kerveros
(74) Attorney, Agent, or Firm—Finnegan, Henderson, Farabow, Garrett & Dunner, L.L.P.

(57) ABSTRACT

A system for monitoring the airport lamp using power-line carrier wave. A host station and respective terminal for monitoring individually the airport lamp L via a rubber transformer are connected in series to a power line derived from a fixed current generator. The host station and terminal include a signal injection section for intermittently injecting control signal/lamp monitoring signal from a higher order system to the power line at a predetermined cycle within a predetermined time from the zero cross of power source waveform of the power line. A signal extraction section for receiving the control signal/lamp monitoring signal is injected to the power line within a predetermined time from the zero cross detection by monitoring only a specific frequency.

10 Claims, 17 Drawing Sheets

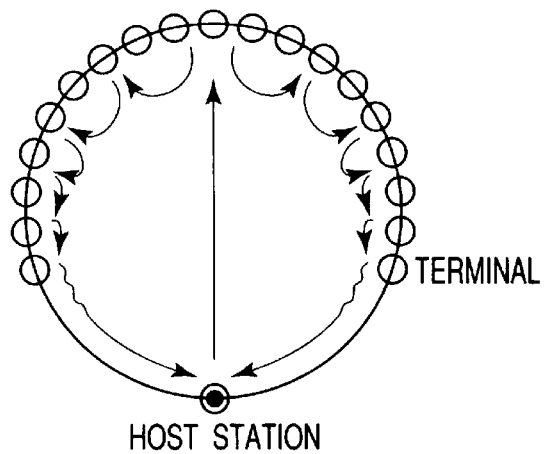
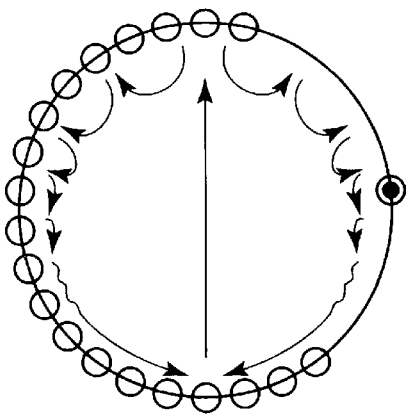
FIG. 21A          FIG. 21B
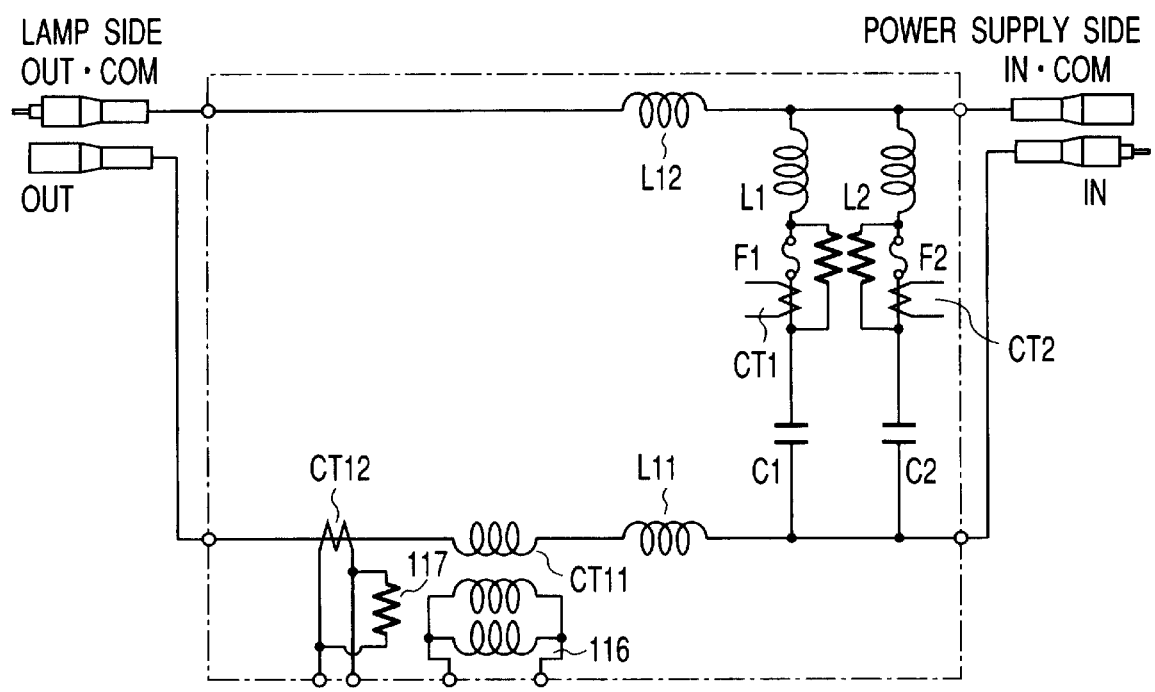
FIG. 22

SYSTEM FOR MONITORING AIRPORT LAMPS

BACKGROUND OF THE INVENTION

This application is based upon and claims the benefit of priority from the prior Japanese Patent Application No. 2000-18891, filed Jan. 27, 2000 and No. 2000-174059, filed Jun. 9, 2000, the entire contents of which are incorporated herein by reference.

The present invention relates to a system for monitoring the operation state of a number of lamps to be installed on runways, taxiways or others in the airport.

An airport lamp detection system for monitoring and controlling the operation state of a number of lamps in the airport using the power line transport technology is known. In an example of such system, as shown in FIG. 1, a host station (not shown) and, respectively through a rubber transformer 63, terminals (slave stations) 64 are connected in series to a power line 62 derived from a fixed current generator (CCR) 61 connected to an alternative current source.

By the way, in such airport lamp monitoring and control system, when a lamp has burned out, a relay switch SW to be connected to that lamp 65 is put OFF, and magnetic saturation phenomenon is provoked by making the secondary side of the rubber transformer 62 open. In short, injection operation of lamp filament cut occurrence signal is performed. On the other hand, while the lamp is normal, signal extraction operation is performed to extract a control signal to be superposed on the power line 62.

Now, the output current rise of the fixed current generator 61 increases generally in a rapid state. However, when the lamp has burned out, it becomes slow until the magnetic saturation of the rubber transformer 63, showing a rise waveform slower than when the lamp is normal. Consequently, a primary side voltage waveform of the power line 62 shows a waveform rising suddenly after a period of time (saturation time) a where the output current rises slowly as shown in FIG. 2. Moreover, when a lamp has burned out, the saturation time a varies according to the level of the waveform rise 66 protruding when the relay switch is open, and consequently, the rise waveform varies.

Now, the host station or higher order system side detect the lamp filament rupture by monitoring the saturation state of the output current form the fixed current generator 61. However, in practice, the detection of lamp filament rupture based on the signal injection operation is sometimes difficult, and the decrease of detection accuracy can not be avoided, because it is difficult to identify the saturation time α, and the rise 66 is not constant. This is because, signals of normal operation and lamp filament rupture are detected by the difference of area through the time integration, as magnetic saturation time of the rubber transformer 63 is not constant. In short, as shown in FIG. 2, the detection accuracy has been hardly improved, because the signal waveform per se during the normal time was unstable, and unreliable.

On the other hand, the fixed current generator in the aforementioned monitoring and control system, is the one designed to supply the power line with power of fixed current and, more concretely, as shown in FIG. 3, adopts a method to select a current waveform S2 of high amplitude between a low amplitude current waveform Si and the high amplitude waveform S2 through the phase control at an appropriate phase angle (60 degrees for example) from the zero cross point of the low amplitude current waveform S1, using a thyristor, output a predetermined fixed current (6.6 A for example) defined beforehand to be used for lamps or other airport equipment, and supply to the power line. Therefore, the current immediately after the phase control varies generally in a rapid rise state, presents a high frequency equal or superior to 50 Hz/60 Hz in respect of frequency, transits to a standard waveform (sinusoidal wave) of 50 Hz/60 Hz when it attains the high amplitude current waveform, but happens to be unstable immediately after this transition.

There, conventionally, in the case of transmitting a required signal using a power-line carrier, control, monitoring or other signals are transmitted using the power-line carrier, by modulating them with a predetermined frequency from a power line mode which is a part of signal processing system, for the high amplitude waveform S2 at such a timing to avoid the low amplitude current waveform on the power line and rapid rise portions immediately after the phase control, and further, unstable portions during the transition to the high amplitude current waveform, namely noise generating portions.

However, the aforementioned monitoring and control system aims only to transmit a signal at an appropriate timing, noise still generates from the fixed current generator by the phase control, and under the influence of this noise, the reception sensibility of host station and respective terminals deteriorates considerably. In addition, this noise is a spike noise generated like as impulse, and moreover, it is extremely difficult to eliminate, as the noise generation point varies according to the tap position (phase control angle) for adjusting the lamp brightness.

Also, in the host station and respective terminals, the control signal and monitoring signal are carried by the power line, using a power line circuit including power line, rubber transformer or the like; however impedance due to LC exists in the power line circuit, and this impedance absorbs signal carried by the power line. This is caused mainly by resonance phenomenon between the rubber transformer reactance L component and the power line and ground capacitance, and there exist abnormal attenuation points of signal carried by the power line. As the result, terminals at the position corresponding to the abnormal attenuation point drop remarkably in their reception sensibility due to the attenuation of carried signal.

Especially, in the case of power-line carrier, abnormal attenuation point is an inevitable problem, because rubber transformers constituting a number of reactance components are installed in the power line circuit. And further, the installation of rubber transformer depends on the lamp location in the airport, and can not be decided arbitrarily, the abnormal attenuation amount increases inconveniently according to the installation mode.

BRIEF SUMMARY OF THE INVENTION

It is an object of the present invention to provide a system for monitoring the lamp operation state without using magnetic saturation of rubber transformer, and an airport lamp monitoring system permitting a high quality transmission, without being influenced by the power line circuit construction conditions.

To solve the aforementioned problems, the present invention relates to an airport lamp monitor system, wherein a host station connected to a higher order system and respective terminals for monitoring individually the airport lamp via a rubber transformer are connected in series to a power line derived from a fixed current generator, the host station transmitting control signal to the respective terminals for using power-line carrier based on a signal from the higher order system, and the respective terminals transmitting a lamp monitoring signal to the host station by using power-line carrier, the host station and terminal comprise:

a signal injection section for intermittently injecting the control signal and lamp monitoring signal to the power line at a predetermined cycle within a predetermined time from the zero cross of power source waveform of the power line; and a signal extraction section including zero cross detection means for detecting the zero cross of power source waveform of the power line and signal reception detection means for receiving the control signal and lamp monitoring signal injected to the power line based on a specific frequency component within a predetermined time from the zero cross detection by this zero cross detection means.

According to the present invention, adopting the aforementioned configuration, it is possible to avoid the prevention of magnetic saturation, because for both the host station and respective terminals, the signal injection section injects intermittently the control signal and lamp monitoring signal to the power line at a predetermined cycle within a predetermined time from the zero cross of power source waveform of the power line and, on the other hand, the signal extraction section can receive the lamp operation state or the like with a high accuracy, by receiving the control signal and lamp monitoring signal injection to the power line based on a specific frequency component within a predetermined time from the zero cross detection.

In order to solve the aforementioned problem, the present invention is characterized by that a filter apparatus comprising a LC resonance circuit resonating the frequency used for the power-line carrier is provided on the output side power line of the fixed current generator, and noise generated from the fixed current generator and signal of the frequency used for the power-line carrier at the output side of the fixed current generator between the host station and each terminal are respectively separated.

The present invention, adopting the aforementioned configuration, installs a filter apparatus including a LC resonance circuit resonating the frequency used for the power-line carrier and sends noise generated from the fixed current generator to the power source generation side by the filter apparatus, and on the other hand, sends signal transmitted and received between the host station and the terminal to the host station and terminal side by means of the filter apparatus, thus separates noise and signal completely, improving the signal transmission quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of invention.

FIG. 21A and FIG. 21B illustrate the influence state of phasing or the like of the host station receiving sign from respective terminals;

FIG. 22 is a diagram showing an example of compensation mean for increasing the lamp side impedance;

DETAILED DESCRIPTION OF THE INVENTION

Now, the subject-matter to be realized by this apparatus will be explained prior to describing embodiments of the present invention.

(1) When a lamp has burned out, the system according to the present invention intends to change the power source waveform by intermittently injecting signal at a predetermined timing, monitor only a specific frequency component at a central control room 3 side including a host station, and detect the lamp filament rupture from the variation of this component without magnetic saturation, in place of opening for a fixed period the secondary power supply line of a rubber transformer 63 and seizing an accidental phenomenon signal for, for example, generating magnetic saturation change characteristic to the rubber transformer, as in the conventional apparatus.

(2) Moreover, the system according to the present invention, being a power-line carrier method for superposing signal directly on the power line, will be constituted to install a bypass filter for preventing power source noise from generating in the communication section, and to separate noise and signal. In addition, concerning security measures in the airport, for instance, a fixed current generator (CCR) is installed in the power source of the airport illumination equipment and this fixed current generator can be adjusted in five levels of brightness (for instance, 6.6 A, 5.2 A, 4.1 A, 3.4 A, 2.8 A), and it attains 5000V when maximum. There, it is constituted to connect display element such as LED to the bypass filter, and to confirm that the current is flowing currently.

Figure 4:
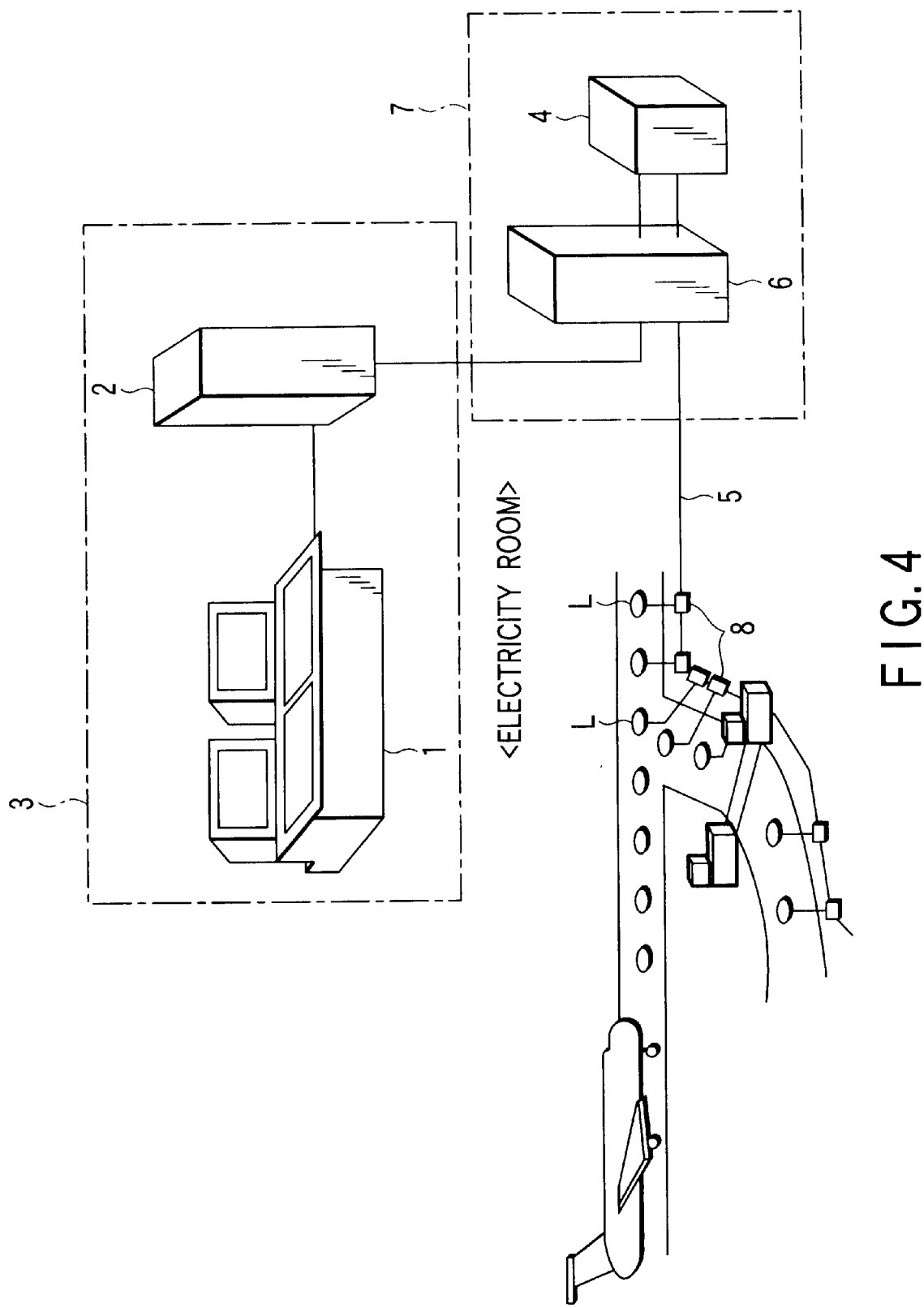
FIG. 4 is a general configuration example diagram of the airport lamp monitor system according to the present invention.

Next, an embodiment of the airport lamp monitor system according to the invention will be described with referring to FIG. 4.

This airport lamp monitor system comprises . . . lamps L in the airport, a central monitoring room 3 including an operator console 1 for performing the operation state display of sensors or the like, control of lamps L, operation test of respective terminals, reset or other operation of respective terminal, and a higher order system constituted of a monitoring control panel 2 or the like connected to this console 1 via a control LAN, and mutually transmits and receives signal to and from the operator console 1, a transmission host station 7 including a fixed current generator (CCR) 4 connected to an alternative power source and a host station control panel 6 connected to a power line 5 derived from this generator 4 via a transformer for collecting the operation state of center lamp, stop line lamp, access lamp or other various lamps L installed on runways, taxiways, or the like and monitor signals that are detection signals of various sensors, informing the central monitoring room 3 which is a higher order system of them, or transmitting control signal from the central monitoring room 3 to respective terminals 8 via the power line 5, and respective terminals (slave stations) connected similarly to the power line in series via a rubber transformer respectively, for monitoring individually the state of respective lamps L or sensor and executing the control of lamps or others.

Besides, the monitoring control panel 2 is for managing collectively various power line circuit information, and is connected to the transmission host station 7 supervising a single power source circuit via a transmission LAN, and has a function to own individual power line circuit information together with the transmission host station 7.

Figure 5:
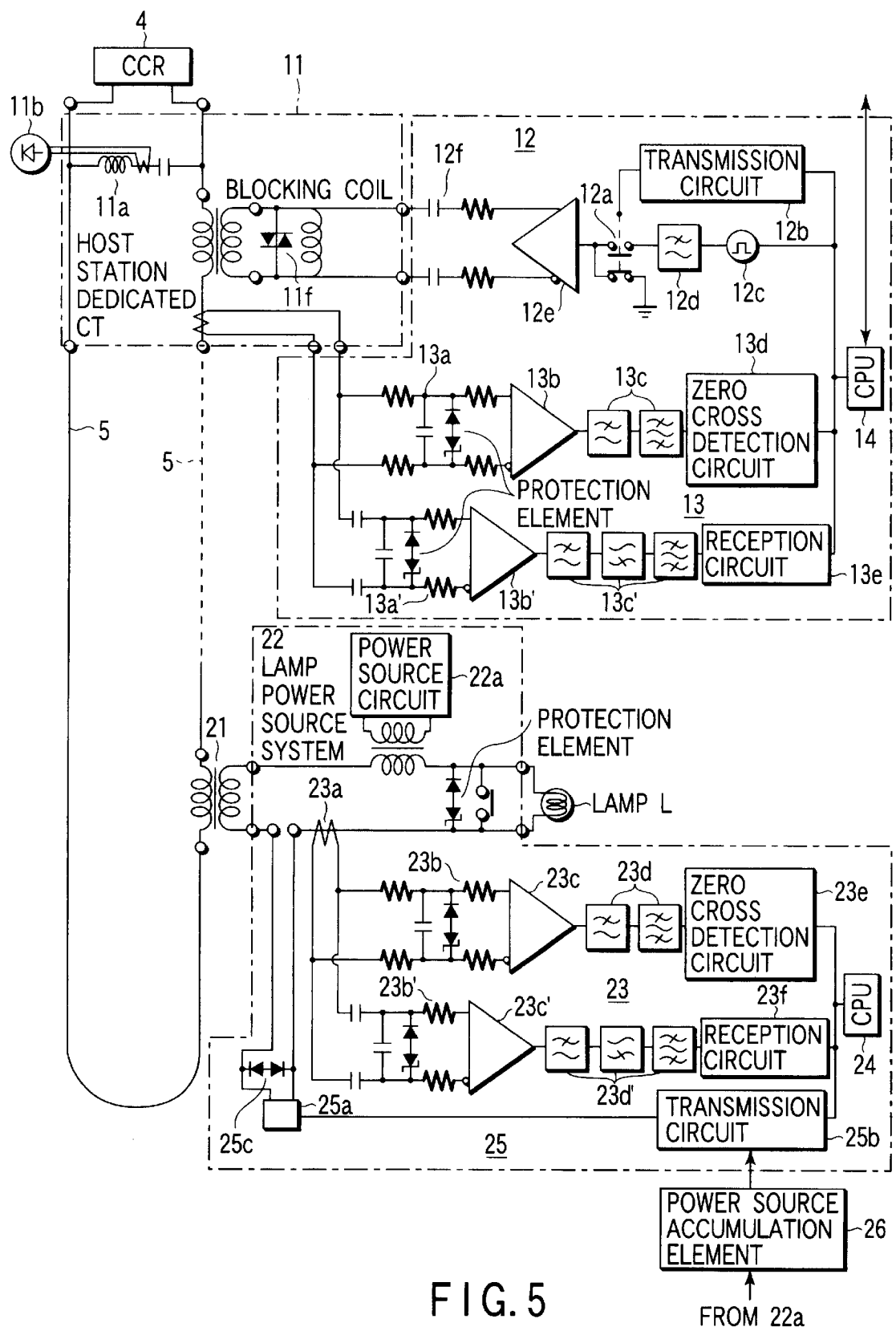
FIG. 5 is a configuration diagram showing an embodiment of the host station and respective terminals in the airport lamp monitor system according to the present invention.

FIG. 5 shows a concrete configuration diagram showing a transmission host station 7 and a single terminal 8 connected in series to a power source apparatus which is an airport illumination equipment derived from a fixed current generator 4 and a power line 5 serving as communication medium in charge of power-line carrier.

A host station control panel 6 is provided at the output side of the fixed current generator 4.

This host station control panel 6 comprises a bypass filter unit 11 for operating to prevent the harmonic noise from the fixed current generator 4 from entering the host station control panel 6 side, respective terminals 8 side and prevent power-line carrier wave of the host station control panel 6 side and respective terminals 8 side from entering the fixed current generator 4, a signal injection section 12 for transmitting control signal to respective terminals 8, a signal extraction section 13 for receiving operation state signal of the lamp L or the like connected to respective terminals 8 and sensor signal, and a CPU 14 or the like connected to the monitoring control panel 2 via a transmission LAN, for converting monitor signal from respective terminal side into information appropriate for the transmission and transferring to the monitoring control panel 2, and receiving control signal from the monitoring control panel 2 and executing necessary transmission control.

Figure 6:
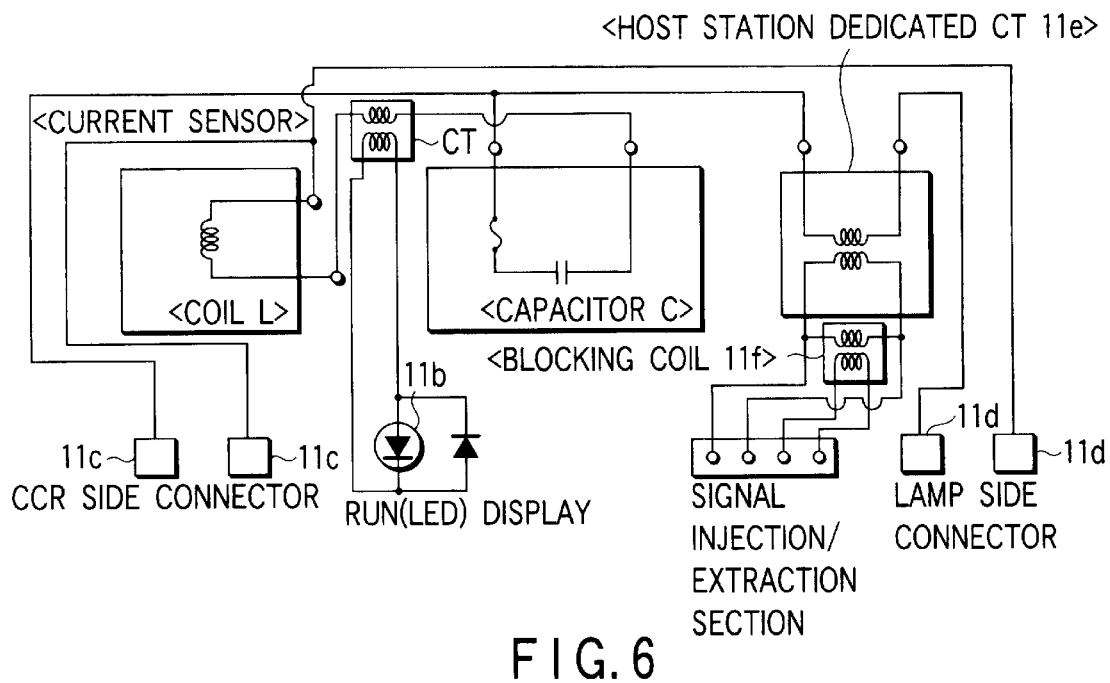
FIG. 6 is a diagram showing a configuration example of the bypass filter unit shown in FIG. 5.

The bypass filter unit 11 comprises, concretely as shown in FIG. 6, a bypass filter 11a of LC resonance circuit constituted of a coil L and a capacitor C, a current confirmation circuit for displaying, for instance on a LED display element 11b, the current flowing state through a current detection sensor current transformer CT, a signal injection side host station dedicated CT11e and a blocking coil 11f interposed between a CCR side connector 11c and a lamp side connector lid, a protection element 11f connected to the signal injection side of the hose station dedicated CT11e. Besides, a resistor may be added as the bypass filter 11a.

The signal injection section 12 comprises a transmission circuit 12b for transmitting by ON/OFF control of a switching circuit 12a, concerning the control signal from a higher order system received via the CPU 14, a pulse signal oscillator 12c for outputting a specific frequency signal affording a time proportion of injection time and non-injection time, an active filter 12d such as low pass, band pass or the like, a signal amplification element 12e and, for instance, a CL resonance circuit 12f for injecting control signal to the power line 5 from the transmission circuit 12b through the signal amplification element 12e.

On the other hand, the signal extraction section 13, for extracting power-line carrier, comprises a zero cross detection system and a signal reception system, the zero cross detection system has a function to detect zero cross from the power source waveform of the power line 5 and comprises a passive filter 13a such as low pass filter, a signal amplification element 13b, an active filter 13c such as low pass, band pass or the like, a zero cross detection circuit 13d for detecting zero cross of the power source waveform and the like, while the signal reception system comprises similarly a passive filter 13a', a signal amplification element 13b', an active filter 13c' such as low pass, band pass or the like, and a reception circuit 13e and the like.

Next, each terminal 8 is connected to the power line 5 respectively by a rubber transformer 21 as shown in FIG. 5, and concretely, comprises a lamp power source system 22, a signal extraction section 23 for extracting power-line carrier waveform superposed on the power line 5 and extracting the operation state of the lamp L, a CPU 24 for judging and storing the control signal extracted from this signal extraction section 23 and the operation state of the lamp L and converting into a predetermined signal, and a signal injection section 25 for injecting the operation state of the lamp L and sensor signal based on the signal processed by this CPU 24.

The lamp power source system 22 comprises a power source circuit 22 for generating power source for the operation of its own terminal.

The signal extraction section 23 comprises a current transformer 23a for taking out power source waveform such as power-line carrier wave or operation state signal of the lamp L or the like appearing at the secondary side of the rubber transformer 21, a passive filter 23b, a signal amplification element 23c, an active filter 23d and a zero cross detection circuit 23e for detecting zero cross of waveform, similar to those of the host station control panel 6 and in addition, similarly, a passive filter 23b', a signal amplification element 23c', an active filter 23dc' such as low pass, band pass or the like, and a reception circuit 23f and the like.

The signal injection section 25 comprises a transmission circuit 25b for receiving a signal extracted by the signal extraction section 23, ON/OFF controlling a switching circuit 25a based on the signal output from the CPU 24, and injecting signal obtained by this control to the power line 5 via the rubber transformer 21.

As power source of this signal injection section 25, it is constituted to accumulate power output from the power source circuit 22a in a power accumulation element 26, supply the transmission circuit 25b with power accumulated in the power accumulation element 26 during the signal injection transmission, and reduce the apparent power source consumption.

In addition, as a number of terminals are connected to a power line 5 derived from a single fixed current generator 4, the more the signal attenuates, the longer the distance of this total power line 5 is, and the higher is the number of terminals. The signal output level of the switching circuit 25a can be increased to extend the signal range distance; however, it is not allowed to consume much power for the terminal signal output, because the power source capacity of the airport illumination equipment is limited. There, as for the signal injection method of respective terminal, it is constituted to dispose terminals are made of a power source substrate 41, a CPU substrate 42 for executing the calculation and a transmission substrate 43. Components for generating power source supplied to respective terminals 42, 43 or the like will be incorporated in the power source substrate 41, components for performing monitoring and control lamp L and sensor based on transmission/reception signal are incorporated in the CPU substrate 42 and components concerning the power-line carrier will be incorporated in the transmission substrate 43.

Among them, taking the terminal into consideration, the transmission substrate 43 comprises a timing setting section 44 for setting timing data for signal injection timing, an address setting section 45 for setting beforehand the address of its own terminal, a transmission/reception section 45 including a reception circuit 23e, a transmission circuit 25b or the like, a signal extraction circuit 46 including a passive filter 23b, a signal amplification element 23c, an active filter 23, a passive filter 23b', a signal amplification element 23c', an active filter 23' or the like, a circuit 47 including a zero cross detection circuit 23e, a drive circuit 48 including a switching circuit 25a, a signal injection circuit 49 including a protection element 25c and other elements concerning signal injection, or the like. a switching circuit 25a at the secondary side of the rubber transformer 21, and to generate signal by ON/OFF control of this switching circuit 25a. Next, a protection element 25c is provided at the terminal signal inlet, allowing to adjust the injection signal output level.

The above points are similar for the signal injection of the host station control panel 6, and a switching circuit 12a is provided.

Figure 7:
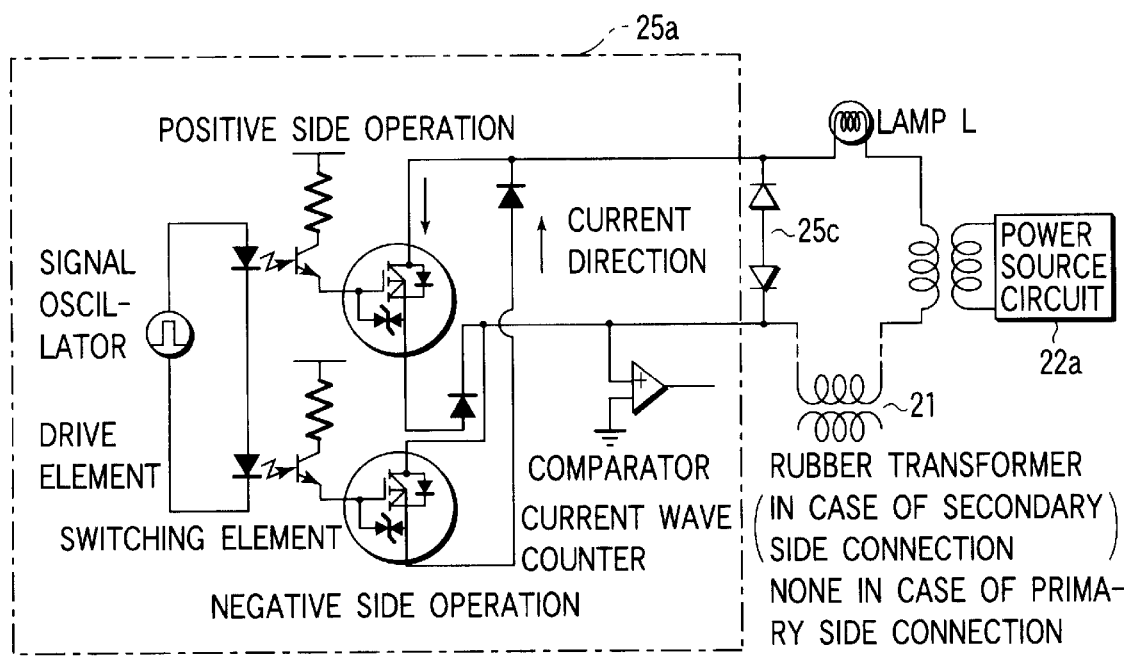
FIG. 7 is a diagram showing a configuration example of he switch circuit shown in FIG. 5.

Besides, while FIG. 5 shows schematically the configuration of the switching circuit 12a, 25a, its configuration can be shown more concretely as in FIG. 7. By the way, concerning the terminal side switching circuit 25a, it comprises a pulse signal oscillator for outputting specific frequency signal differentiated in time width for injection time and non-injection time, a positive side operation switching element and a negative side operation switching element connected to the output side of the pulse signal oscillator and operating respectively at the positive side and the negative side of the pulse signal, and a direction regulation element such as diode, and further, a protection element 25c is provided at the output side of the terminal side switching circuit 25a.

Figure 8:
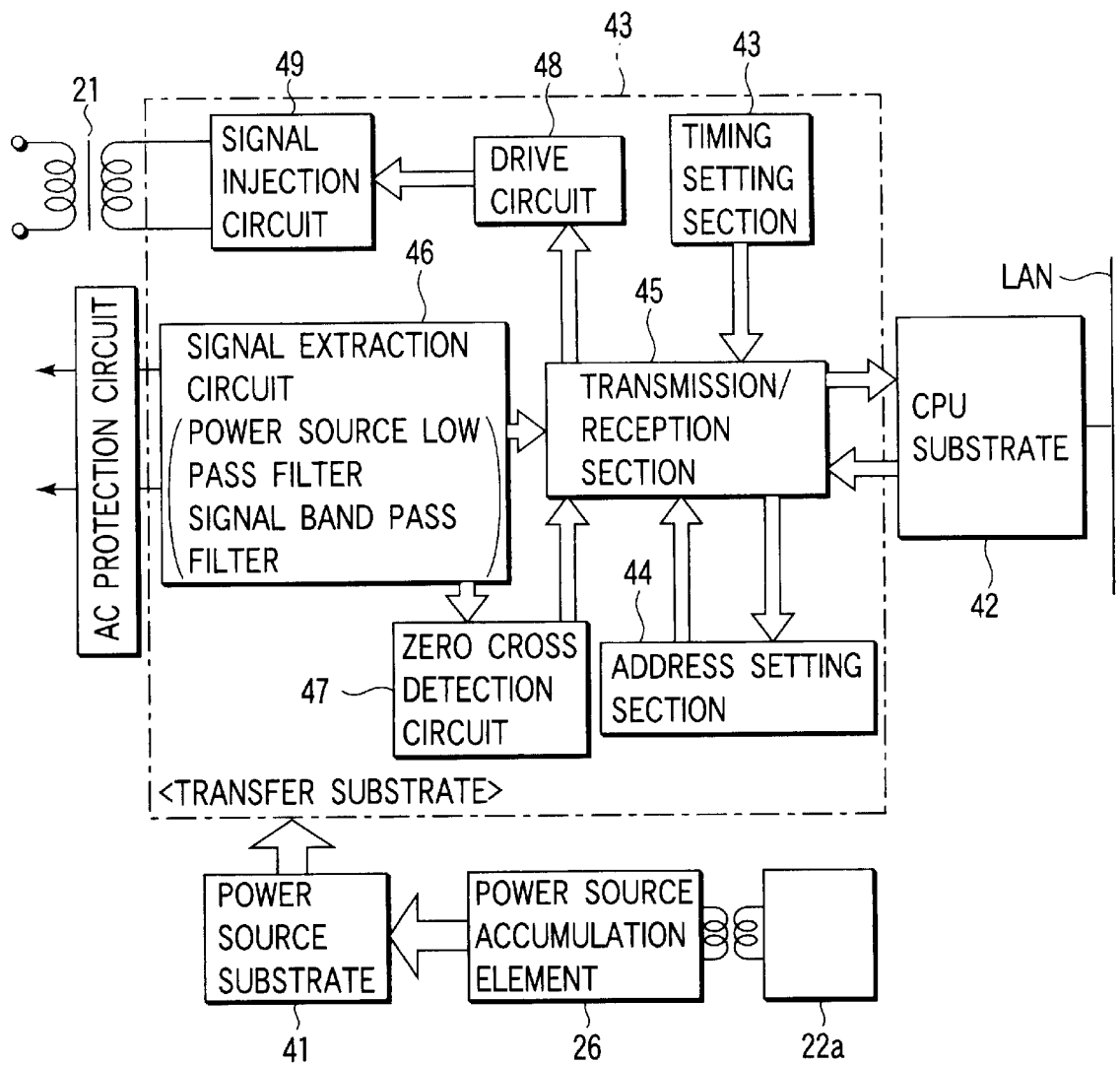
FIG. 8 is a configuration diagram allocating components of the host station/respective terminals into substrates.

FIG. 8 is an example allocating components of the host station/ terminal (slave station) into substrates.

In short, both host station and respective terminals are made of a power source substrate 41, a CPU substrate 42 for executing the calculation and a transmission substrate 43. Components for generating power source supplied to respective terminals 42, 43 or the like will be incorporated in the power source substrate 41, components for performing monitoring and control lamp L and sensor based on transmission/reception signal are incorporated in the CPU substrate 42 and components concerning the power-line carrier will be incorporated in the transmission substrate 43.

Among them, taking the terminal into consideration, the transmission substrate 43 comprises a timing setting section 44 for setting timing data for signal injection timing, an address setting section 45 for setting beforehand the address of its own terminal, a transmission/reception section 45 including a reception circuit 23e, a transmission circuit 25b or the like, a signal extraction circuit 46 including a passive filter 23b, a signal amplification element 23c, an active filter 23, a passive filter 23b', a signal amplification element 23c', an active filter 23' or the like, a circuit 47 including a zero cross detection circuit 23e, a drive circuit 48 including a switching circuit 25a, a signal injection circuit 49 including a projection element 25c and other elements concerning siganl injection, or the like.

Now, the operation of the system constituted as mentioned above will be described.

Figure 1:
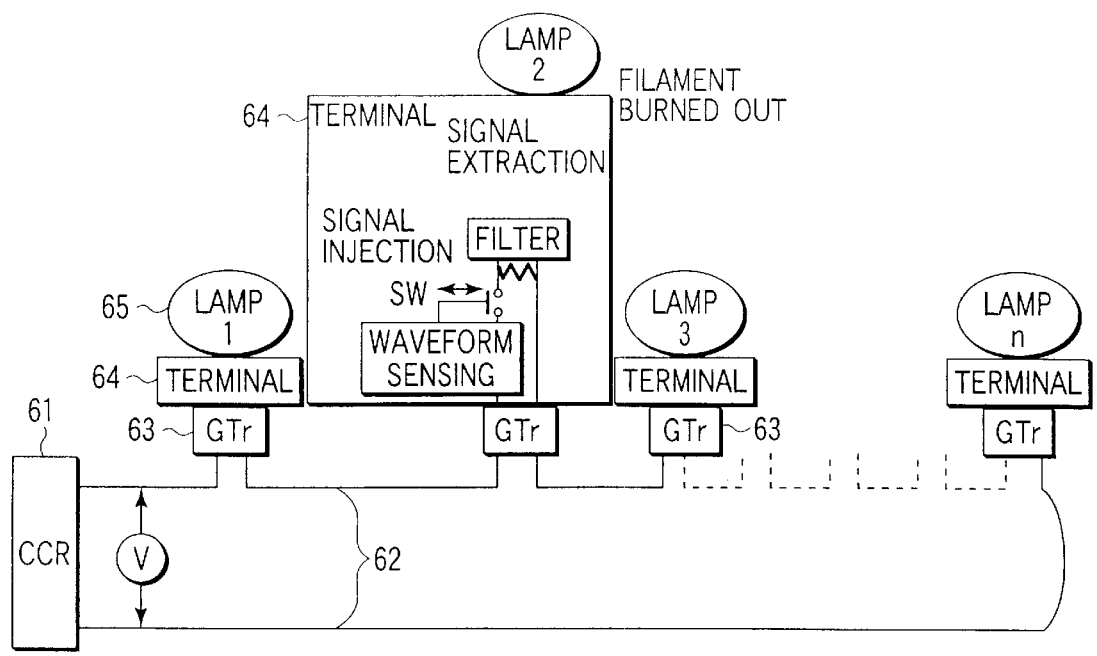
FIG. 1 is a general configuration diagram of a conventional general airport lamp detection system using a power-line carrier wave.
Figure 2:
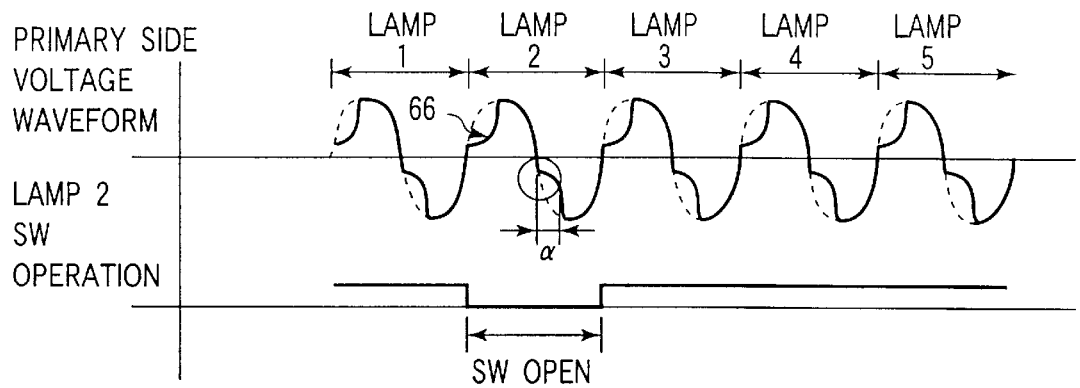
FIG. 2 is a diagram illustrating the relationship between the magnetic saturation of rubber transformer used for the system shown in FIG. 1 and lamp filament rupture.
Figure 3:
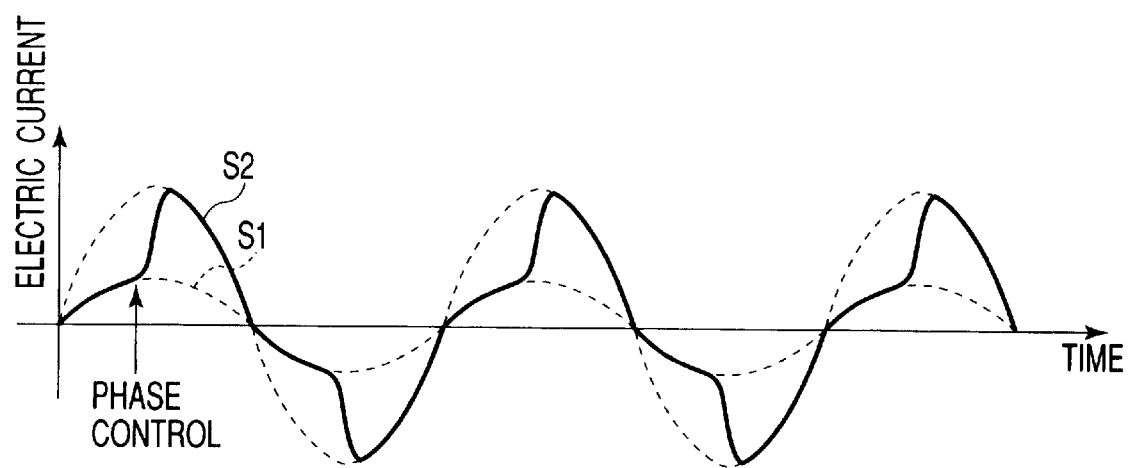
FIG. 3 is a diagram illustrating an example of power source waveform changeover by phase control by a fixed current generator.
Figure 9:
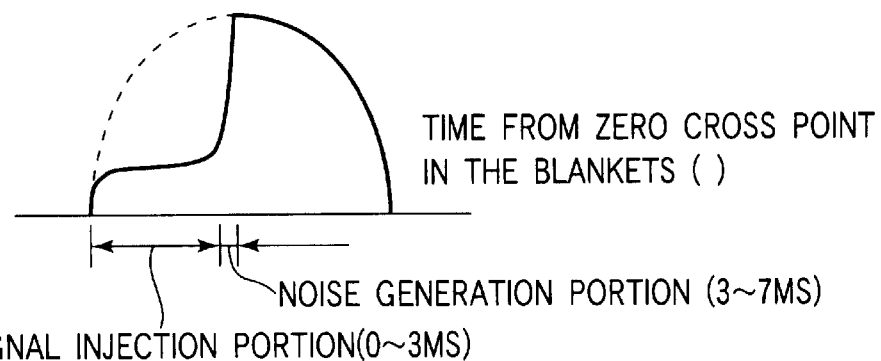
FIG. 9 is a diagram illustrating the signal injection time band for the power source waveform output from the fixed current generator.

Now, in the case of using the fixed current generator (CCR) 4 as power source for the airport illumination equipment, the output power source waveform of this fixed current generator 4 is constituted of two positive and negative sinusoidal waves as shown in FIG. 2 of a conventional example, and when only the positive side is represented, it shows a waveform as shown in FIG. 9. In short, in the case of switching over to the one (phase control), as shown in the same drawing, a slow state appears from the zero cross point to a certain section, however, a rapid rise appears thereafter. This rapid rise portion is a portion provoking the noise generation, and when a signal is injected in this noise generation portion, and the signal component frequency coincides with the noise component frequency or is in the vicinity thereof, the signal separation becomes difficult.

There, the fixed current generator 4 performs the phase control for adjusting to 5 levels of brightness (TAP1 to TAP5), the phase control is performed most rapidly at the brightest TAP5. For example, when 50 Hz, it is performed from the zero cross point to the proximity of 3 ms.

Therefore, in the system according to the present invention, the timing is set by the timing setting section 43 so as to inject signal before performing the phase control at TAP5 where the brightness is adjusted to the maximum, and after the detection of zero cross point of the power source waveform by the zero cross detection circuit, signal is injected by starting the pulse signal oscillator with, for instance, a CPU 24 based on the timing data, and controlling the transmission circuit 25b.

Figure 10:
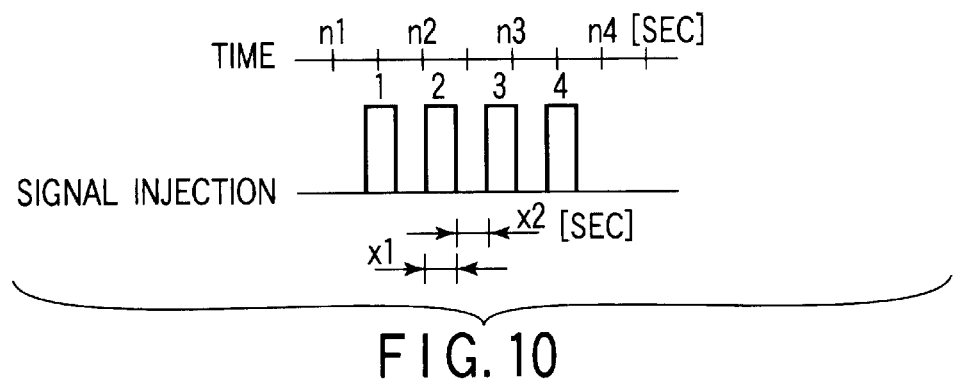
FIG. 10 is a diagram illustrating an example of signal injection.

As for the injection method when signal is injected, as shown in FIG. 10, it will be made to allow to avoid easily the magnetic saturation of the rubber transformer 21 by changing intermittently previously with the time width of injection time x1 and non-injection time x2 based on the pulse signal output from the pulse signal oscillator.

This variation of the time width of injection time x1 and non-injection time x2 is effective in the case of switching control of the switching circuit 25a that turns ON/OFF the secondary side of the rubber transformer 21 particularly by the terminal 8. It becomes more effective, when the injection time x1, namely opening time of the secondary side circuit is made sufficiently shorter than the non-injection time x2.

Next, the signal extraction method will be described referring to FIG. 11.

Figure 11:
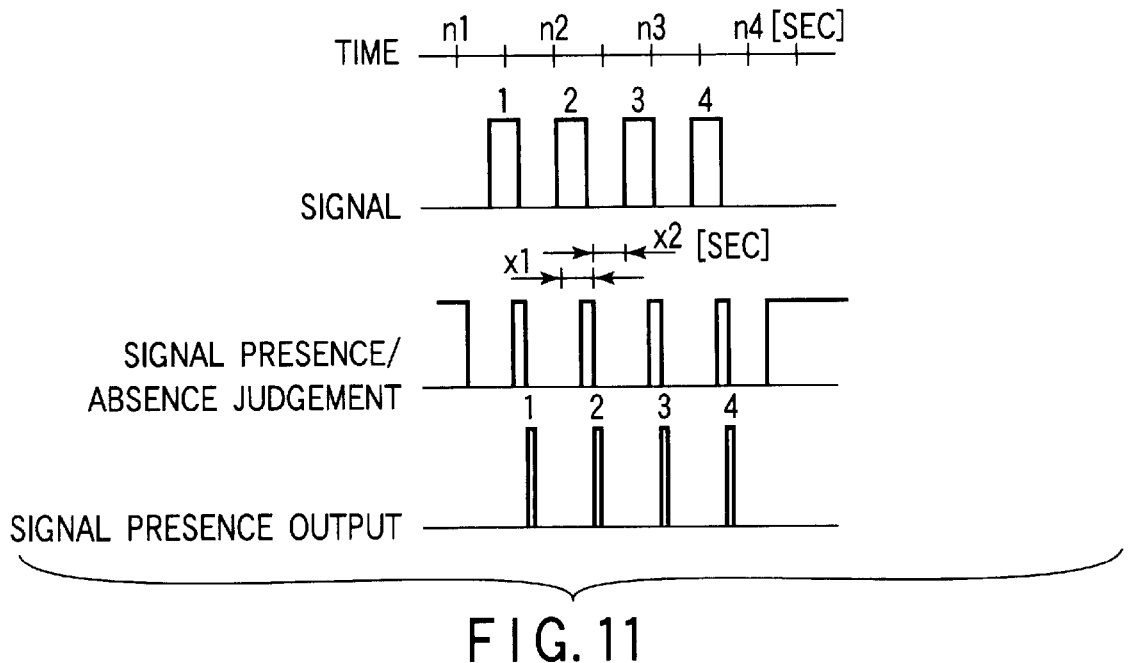
FIG. 11 is a diagram illustrating an example of signal extraction.

In the signal extraction, as a waveform similar to the waveform (FIG. 10) injected as shown in FIG. 11 is received and observed at the reception side, for the reception signal, for example, after the detection of the zero cross point of power source waveform by the zero cross detection circuit, and the reception of the reception signal by the reception circuit at a predetermined timing, the CPU 24 judges the presence of signal for a fixed period of time from the viewpoint of distinction from noise, and outputs the presence of signal in the case of holding the state of presence of signal during this period of time. It is considered that the signal extraction shown in FIG. 11 is a technique effective in the case where the signal level is equal or superior to a certain fixed level.

Figure 12:
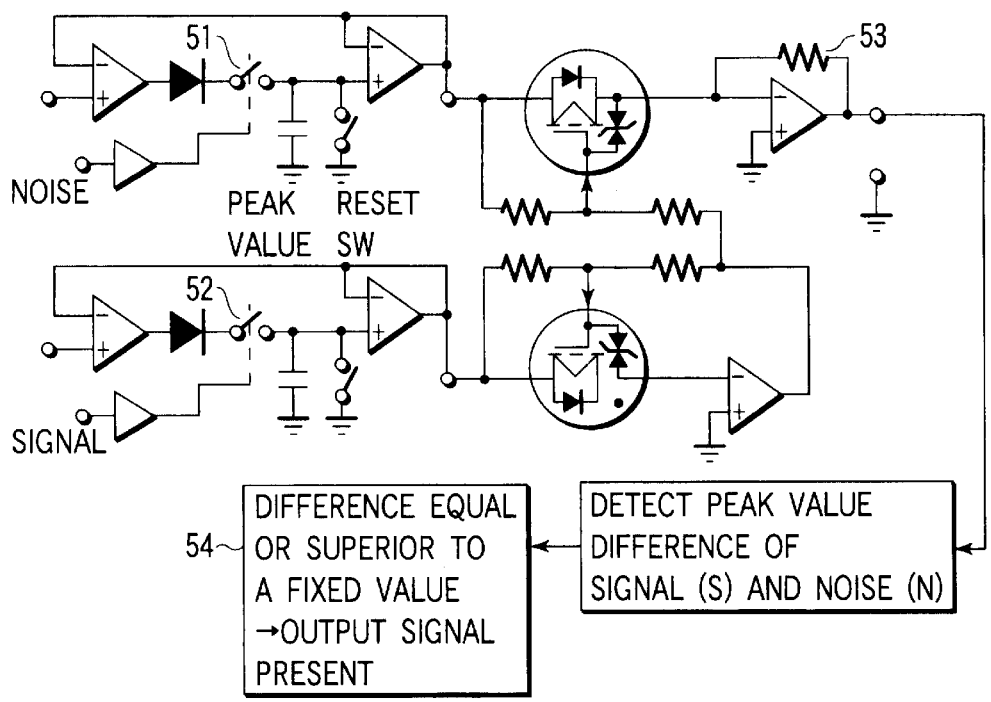
FIG. 12 is a diagram illustrating an example of signal extraction in the case of low S/N ratio.

On the other hand, in the case when the S/N ratio, namely difference between signal level S and noise N is small, signal is extracted using a configuration as shown in FIG. 12. This signal extraction means comprises noise hold means 51 for holding the noise level, signal hold means 52 for holding the signal level, comparison means 53 for comparing levels held by both hold means 51, 52, and signal presence/absence judgment means 54 for outputting the presence of signal when the difference between signal S and noise N obtained by this comparison means 53 is equal or superior to a fixed level, and extracts the reception signal.

Figure 13:
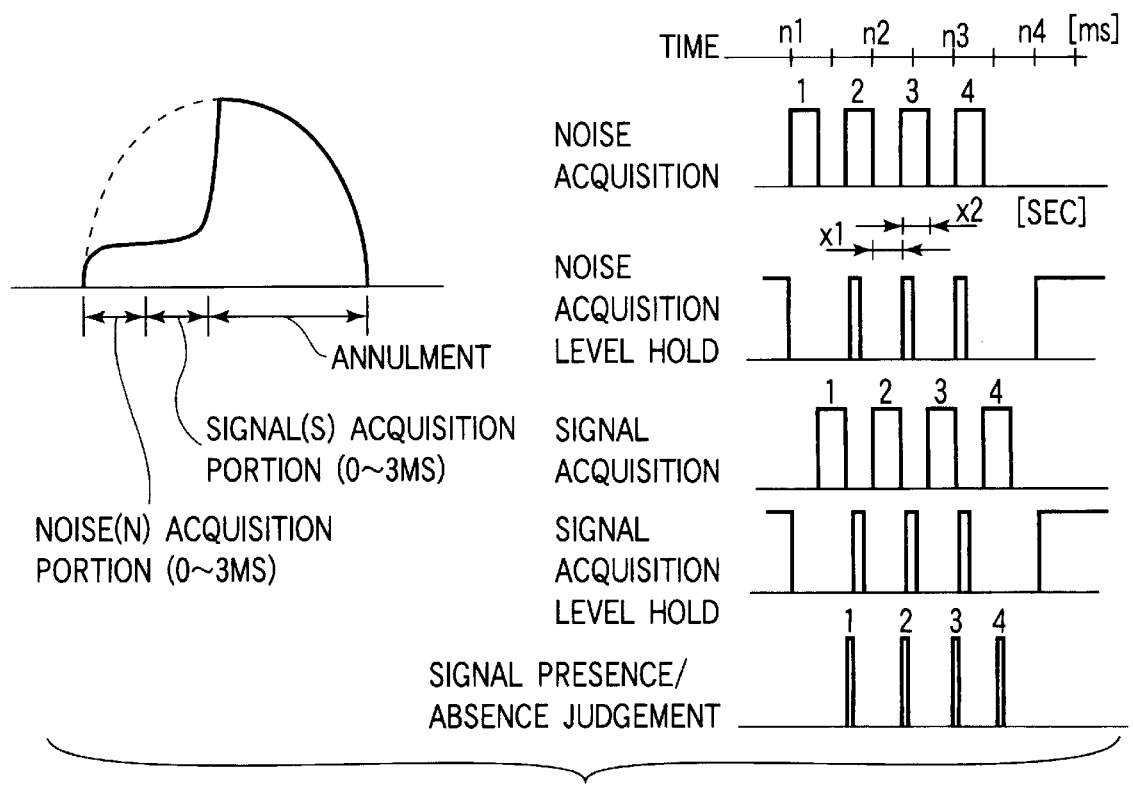
FIG. 13 is an illustrative diagram accumulating noise and signal separately in the case of low S/N ratio, and judging the presence of signal from the accumulation of these noise and signal.

FIG. 13 illustrates the signal extraction for timing, concerning the signal extraction configuration example shown in FIG. 12.

First, it is set previously to detect noise and signal in respectively different time bands from the zero cross point of power source waveform and, on the other hand, noise level and signal level are held for a predetermined period of time within the detection time band of such noise and signal, it is judged that the signal exists when the difference between signal S and noise N is equal or superior to a fixed level similarly as the foregoing, and the reception signal is extracted.

Consequently, according the embodiment as mentioned above, the host station 7/respective terminals 8 inject the control signal and lamp monitoring signal intermittently to the power line at a predetermined cycle within a predetermined period of time from the power source waveform zero point of the power line 5, and on the other hand, detect the power source waveform zero point of the power line 5, monitor signal of specific frequency component within a predetermined period of time from this zero cross detection, and receive the control signal/lamp monitoring signal injected into the power line, therefore, lamp operation state or the like can be detected with a high precision without using magnetic saturation.

In addition, the installation of a power accumulation element 26 for accumulating power for the power source circuit 22a used for the lamp L to be connected to respective terminals 8 permits to use power accumulated in power accumulation element 26 at least during the signal injection of the signal injection section 25 and to reduce considerably the power source consumption of respective terminals, and eventually, of the whole system.

Moreover, when a display element 11b is connected via a current transformer to the bypass filter 11a interposed between the power lines 5 derived from the fixed current generator 4, the flowing state of output current from the fixed current generator 4 can be confirmed easily, and it is possible take all possible measures to ensure the security against the high voltage of the airport equipment during the inspection or other operations.

Moreover, as the predetermined period noise level and signal level are respectively accumulated and held within different predetermined period from the detection power source waveform zero cross of power line, the difference of these held signal level and noise level is detected, and it is judged that the signal exists when the difference is equal or superior to a predetermined value, signal can be detected with good S/N ratio, even when, for example, the signal level of control signal or lamp monitoring signal is low.

As mentioned above, according to each embodiment, lamp operation state or the like can be detected with a high precision without using magnetic saturation of the rubber transformer, and the reliability of lamp filament rupture detection can be ensured, because signal is injected and extracted intermittently within a predetermined period of time using zero cross of power line power source waveform.

Next, another embodiment of the present invention will be described referring to FIG. 14.

Figure 14:
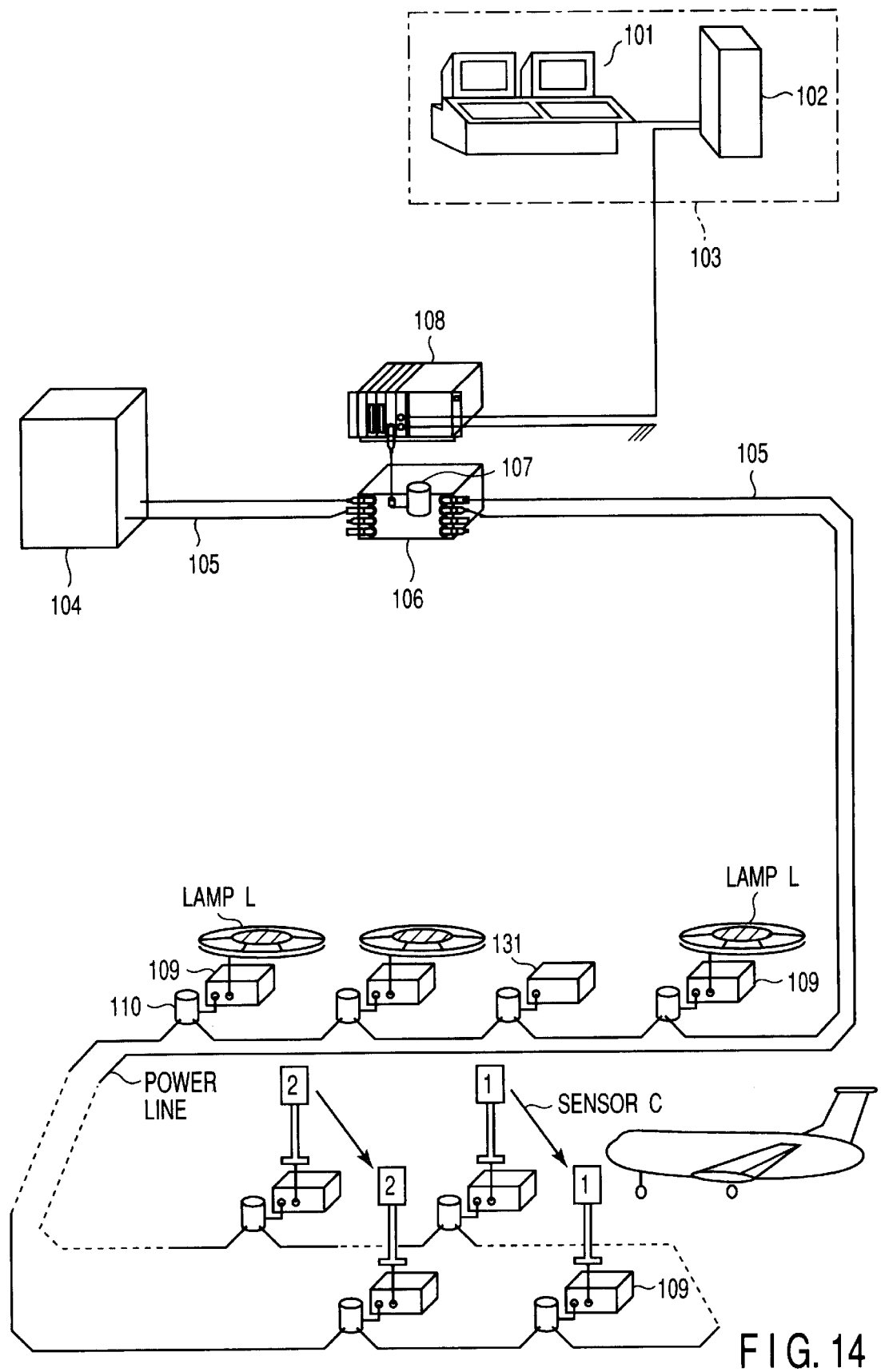
FIG. 14 is a general configuration diagram showing an example of the airport lamp monitor system according to the present invention.

FIG. 14 is a general configuration diagram showing an example of the airport lamp monitor system according to the present invention. This monitor control system comprises various lamps L as equipment in the airport, a central monitoring room (hereinafter, called higher order system) 103 including an operator console 101 for performing the operation state display of sensors C or the like, control of turning ON/OFF lamp L, operation test of respective terminal, reset or other operation of respective terminal, and a monitoring control panel 102 or the like connected to this console 101 via a control LAN, and mutually transmits and receives signal to and from the operator console 101 and the like, a fixed current generator (CCR) 104 for generating and outputting a fixed current from a commercial alternative power source, a filter apparatus 106 having a bypass filter function provided at a position relatively near the output side of the fixed current generator 104 among power lines 105 derived from this fixed current generator 104, a host station 108 connected from this filter apparatus 106 via a host station dedicated transformer (current injection/extraction sensor) 107, for collecting the operation state of various lamps L and monitor signals that are signals of various other sensors C, informing the higher order system of them, or transmitting control signal from the higher order system 103 to respective terminal 109 via the power line 105, and respective terminals (slave stations) 109 connected to the power line 105 in series via a rubber transformer 110 respectively, for monitoring individually the state of respective lamps L or sensor C and executing the control of lamp L ON/OFF upon the reception of control signal from the host station side.

Besides, the monitoring control panel 102 is for managing collectively various signals concerning various power line circuits, is connected to the host station 108 for supervising a single power source circuit 104 via a transmission LAN, and has a function to own individual power line circuit signal together with the transmission host station 108.

Figure 15:
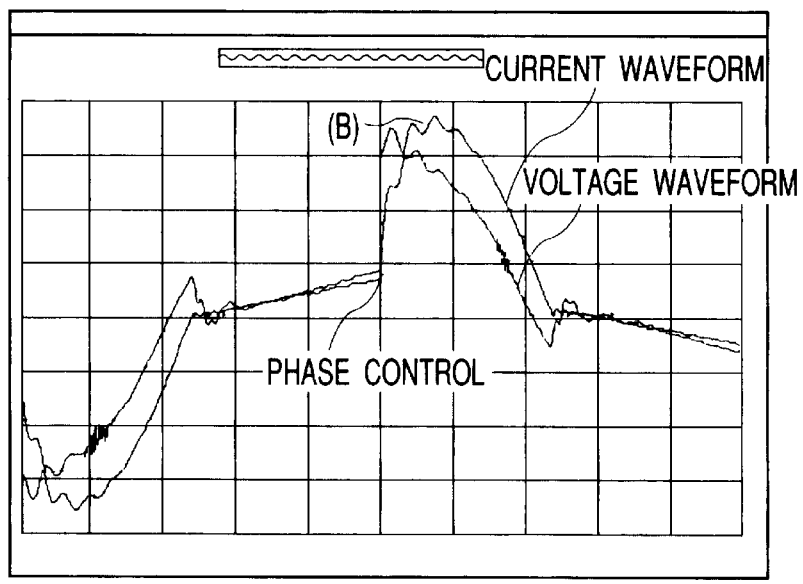
FIG. 15 is a diagram showing the noise generation state of the power source waveform generated from the fixed current generator.

The fixed current generator 104 adjusts the brightness of the lamp L by changing the total current value through the phase control as an appropriate phase angle as shown in FIG. 15, using a thyristor (not shown). The phase angle for this phase control is changed to approach 0 degree side when the lamp L is brighter and 180 degrees side when the lamp L is darker, however the phase angle to be phase controlled may vary according to the system scale. Here, when the phase control is executed, the waveform shows a rapid rise after the phase control, the frequency of this rise section becomes higher than the commercial frequency, and after the rise, a vibration noise is generated as shown by beta β.

Figure 16:
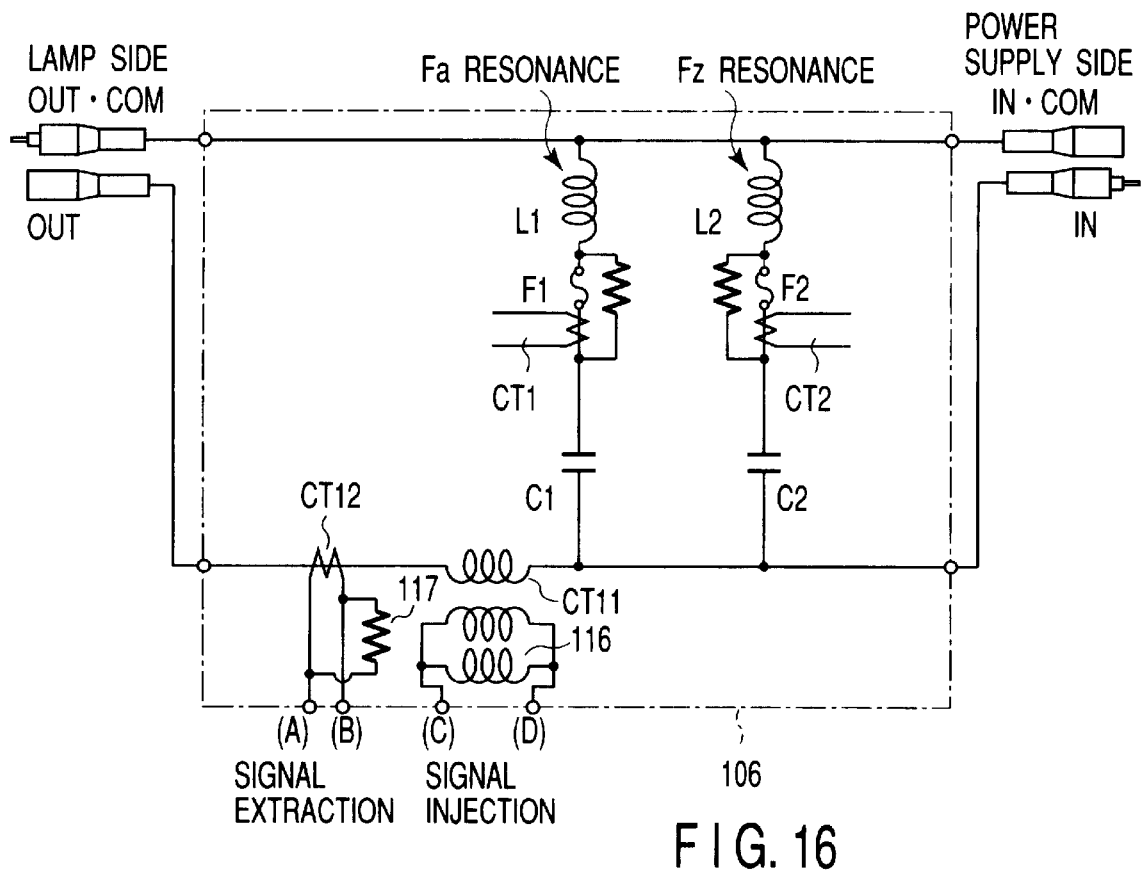
FIG. 16 is a configuration drawing showing a bypass filter apparatus inserted into the power line in the vicinity of the output side of the fixed current generator.

The filter apparatus 106 is provided with an I type LC resonance circuit for each frequency, so as to separate a specific frequency used for power-line carrier in the host station 102 and respective terminals 109 from the fixed current generator side (power source side). For instance, in the case of FSK modulation and power-line carrier of a required signal by a power line mode constituting the transmission system of the host station 102 and respective terminals 109, as two frequencies Fa, Fz are used, an I type L1/C1 resonance circuit resonating Fa and an I type L2/C2 resonance circuit resonating Fz are connected in series between power lines as shown in FIG. 16.

By the way, in the case where the aforementioned LC resonance is not operated normally, signal can not be received between the host station and the terminal; therefore, fault detection current sensor CT1, CT2 are interposed between L1 and C1, and between L2 and C2 respectively through a fuse F1, F2. The secondary side of this current sensor Ct1, and CT2 is introduced, for instance, in the host station 108 or the like. Consequently, in the case of short-circuiting of the capacitor C1, C2, a large current flow breaks the fuse F1, F2, and the current does not flow to the sensor CT1, CT2, thereby allowing to detect the fault of the LC resonance circuit. In the case of open failure of the capacitor C1, C2 also, the fault of the concerned resonance circuit can be detected.

Figure 17:
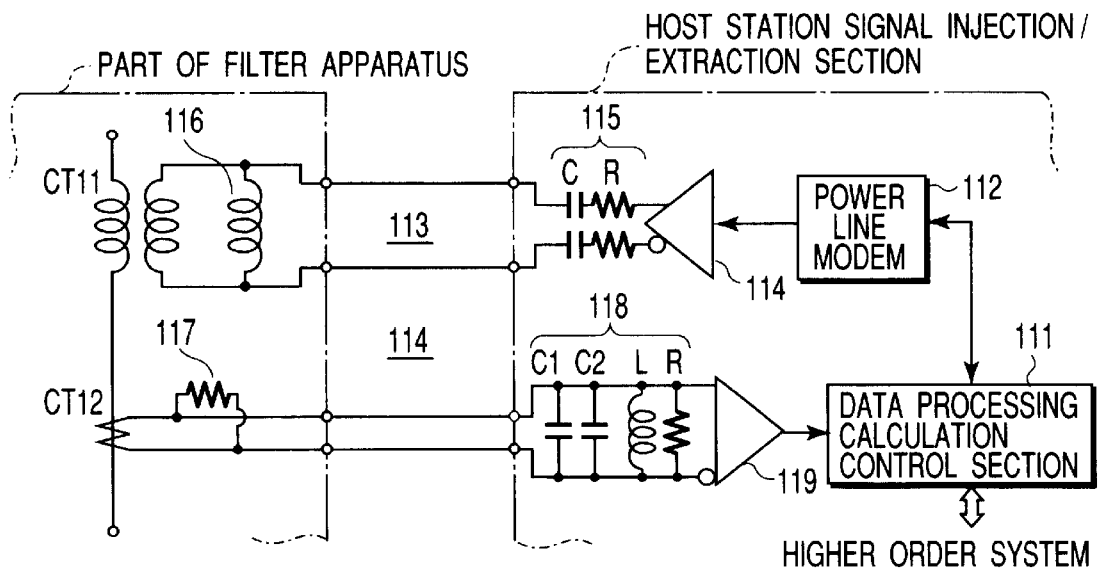
FIG. 17 is a configuration diagram showing the relations between the filter apparatus and the host station side signal injection/signal extraction.

The host station 108 is connected to a filter apparatus 106 interposed on the power line 105 through a host station dedicated transformer (CT11, CT12) 107 and, therein, a data processing calculation control section 111 constituted of CPU, a power line modem 112, a signal injection section 113, signal extraction section 114 and the like are disposed as shown in FIG. 17.

This data processing calculation control section 111 has a function to receive a control signal for respective terminals 109 transmitted from the higher order system 103, to create text data for example, and also to convert monitoring signal from respective terminals 109 into transferable data, and transmit to the higher order system 103.

The power line modem 112 receives, for instance, a predetermined timing instruction obtained from the power source waveform on the power line, and outputs a control signal, for example, converted into text data, by performing frequency shift modulation (FSK). Here, this power line modem 112 is not limited to FSK modulation using two frequencies, but it may be AM modulation, PSK modulation or tone burst method, using a single frequency.

The signal injection section 113 injects the control signal subjected to frequency shift modulation by the power line modem 112 to the power line 105 through a transmission amplification element 114, a CR resonance circuit 115, a blocking coil 116 and a transformer CT 11 in the filter apparatus 106, and the like.

The signal extraction section 114 is for extracting signal carried by the power line, and comprises a transformer CT12 in the filter apparatus 106, and an open protection resistor 117, for example a passive filter 118, a reception amplification element 119 and the like.

Figure 18:
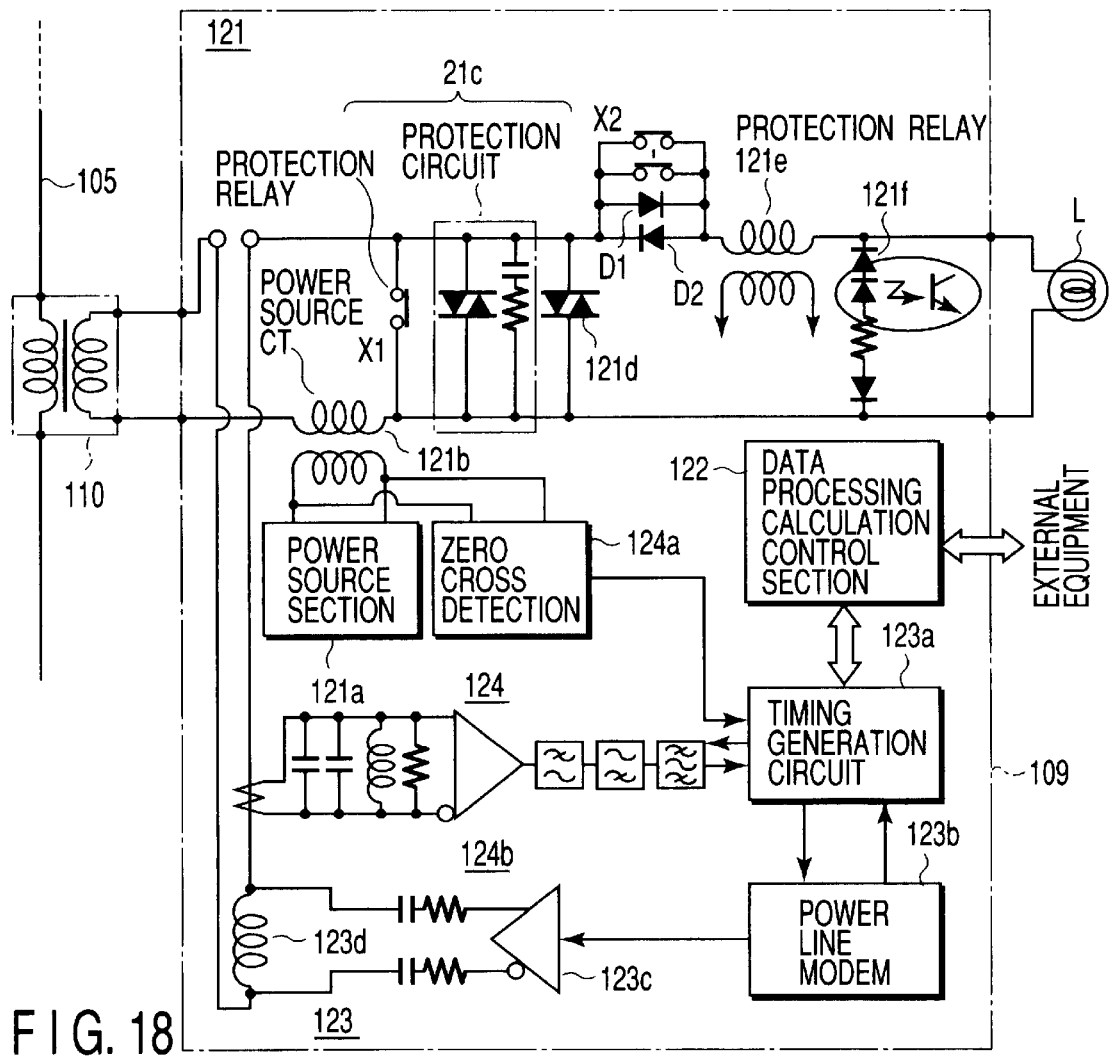
FIG. 18 is a configuration diagram of respective terminals to be connected to the power line.

Each terminal 109 is connected to the power line 105 respectively through a rubber transformer 110 and concretely, has a configuration as shown in FIG. 18.

In short, each terminal 109 comprises a lamp power source system 121, a data processing calculation control section 122 constituted of a CPU for taking in the state of lamps L or the like connected to this lamp power source system 121 for creating a text data, for controlling the lamp L based on the text data received from the host station 108 through the power line 105, and further, for performing necessary processing according to instructions from an external equipment or input equipment, a signal injection section 123, and a signal extraction section 124.

The lamp power source system 121 comprises a power source section 121a for generating a power source for the operation of its own terminal, a current transformer 121b for taking out the power source for the operation of its own terminal, various protection circuits 121c for protecting the lamp L, an ON/OFF control section 121d such as triac for controlling the turning on/off of the lamp L, a current detection section 121e for detecting overcurrent, and a lamp filament rupture detection circuit 121f for detecting the filament burn-out of the lamp L and others, and these detection signals are sent to the data processing calculation control section 122.

The signal injection section 123 includes a timing generation circuit 123a for taking in and outputting the text data created by the data processing calculation control section 122 at a predetermined timing after the detection of zero cross of power source waveform outputted from the fixed current generator 104, a power line modem 123b for transmitting the text data at two specific frequency subjected to frequency shift modulation (FSK), a transmission amplification element 123c for amplifying the signal output from this power line modem 123b, and a signal injection reactance 123d for injecting signal to the power line 105.

The signal extraction section 124 is constituted of zero cross detection means 124a including the timing generation circuit 123a for detecting the zero cross of power source waveform output from the fixed current generator 104, a passive filter, a reception amplification element, an active filter such as low pass, band pass or the like, and further a timing generation circuit 123a and signal detection means 124b including a data processing calculation control section 122.

Now, the operation of the monitoring control system as mentioned above will be described referring to drawings.

First, as a general operation of monitoring control system, the monitoring control panel 102 receives monitoring signal of lamp L and sensor C transmitted from the host station 108, transmits to the operator console 101, and displays the operation state of lamps, or the like. In addition, the console 101 of the higher order system 103 inputs necessary control instructions from the controller, sends control signals such as lamp L turning ON/OFF control, each terminal operation test, each terminal reset or the like to the respective terminal 109 through the monitoring control panel 102 and the host station 108, monitors collectively the response state of this terminal side by the operator console 101 and, at the same time, performs the control.

The host station 108 is, normally, connected one by one to a single fixed current generator 104, transmits and receives signal between the higher order system 103/respective terminal 109 and transfers necessary signal to the higher order system 103/lower order terminal 109.

In short, the host station 108, becoming the primary station, takes in control signal or the like transmitted from the higher order system 103, edits to for example text data necessary for the data processing calculation control section 111, thereafter, sends to the power line modem 112 at a predetermined timing based for instance on a signal from the power line 105. This power line modem 112 FSK modulates the text data, injects into the power line 105 through the filter apparatus 106, and transfers to requiring terminal 109.

The respective terminal 109 detects the zero cross of power source waveform through the rubber transformer 110 and the power source CT21b, predicts the superposition period of the text data to be superposed to the power source waveform beforehand by the timing generation circuit 123a, takes in the text data to be superposed to the power source waveform extracted by the signal extraction section 124 during this prediction period, and sends to the data processing calculation control section 122. This calculation control section 122 controls turning on/off of lamp L by controlling the ON/OFF control section 121, when it judges that the control signal is addressed to it-self from the text data.

Figure 19:
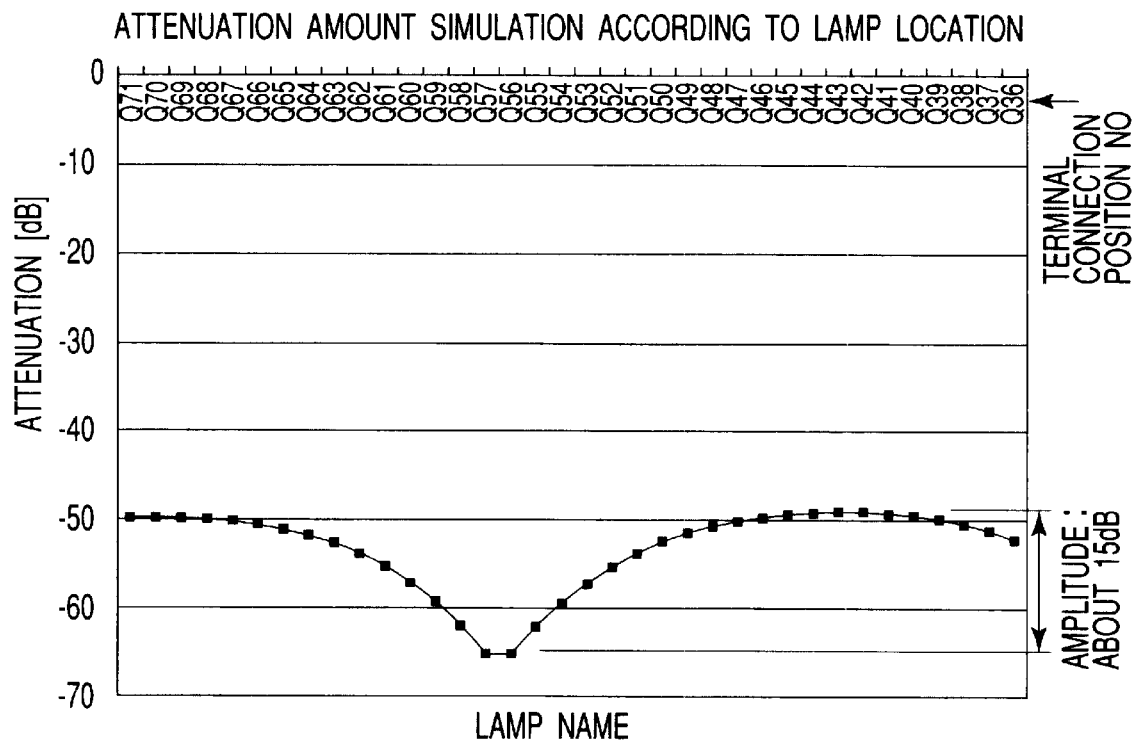
FIG. 19 is a diagram illustrating the reception level depression due to phasing, standing wave at respective terminal connection positions.

By the way, in general, the power line circuit including the power line 105 and the rubber transformer 110 has a closed loop configuration, and the reception level of frequency used for power-line carrier varies according to the power line connection position of the terminal as shown in FIG. 19. In short, a slow depression appears in the reception level at its reception range position according to the used frequency band. As the result, the level varies according to the position of the terminal connected to the power line 105, and the level difference between the best reception level point and the worst reception level point attains several dB to several tens of db. This is because of phasing of used frequency and existence of standing wave. Phasing means reception of transmission wave at the reception point passing through a plurality of paths, mutual cancellation or enhancement by the carrier wave phase, or reception signal fluctuation.

Next, an embodiment for reducing the influence of phasing or the like will be described.

(1) The lamp equipment of the airport or the like has specificity in the installation of the host station 108 and the respective terminal 109. In short, the host station 108 is installed at a position distal to the terminal 109, and respective terminals 109 are installed so as to form a group.

Figure 20:
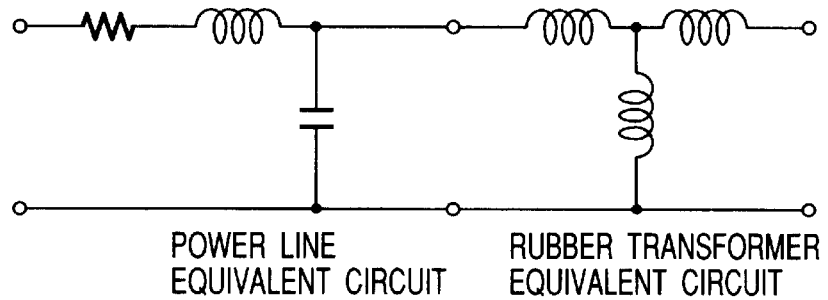
FIG. 20 represents an equivalent circuit of power line and rubber transformer.

Now, an equivalent circuit of a power line circuit constituted of the power line 105 and the rubber transformer 110 can be represented as shown in FIG. 20 phasing or the like appears as shown in FIGS. 21A and 21B, as they are waves reflecting from the central point of these equivalent circuits. When the host station 108 transmits a signal to the terminal 109, it becomes a transmission to a distal group as shown in FIG. 21A, and phasing affect little the respective terminal 109. On the other hand, when the terminal 109 transmits to the host station 108, it is affected considerably by the phasing, as a stand alone remote host station 108 exists in one side as shown in FIG. 21B.

There, the system of the present invention intends to lower the attenuation slope of the reception level used for power-line carrier by installing compensation reactance elements L11, L12 in the bypass filter apparatus 106 as shown in FIG. 22, and increasing the lamp side impedance, and eventually to avoid the effect of the phasing or the like and improve the transmission quality by increasing the reception level.

(2) This monitoring control system contrives compensation means for extending the distance between the power source side and the lamp side similarly in the bypass filter apparatus 106, and signal reception means by the host station 108.

Figure 23:
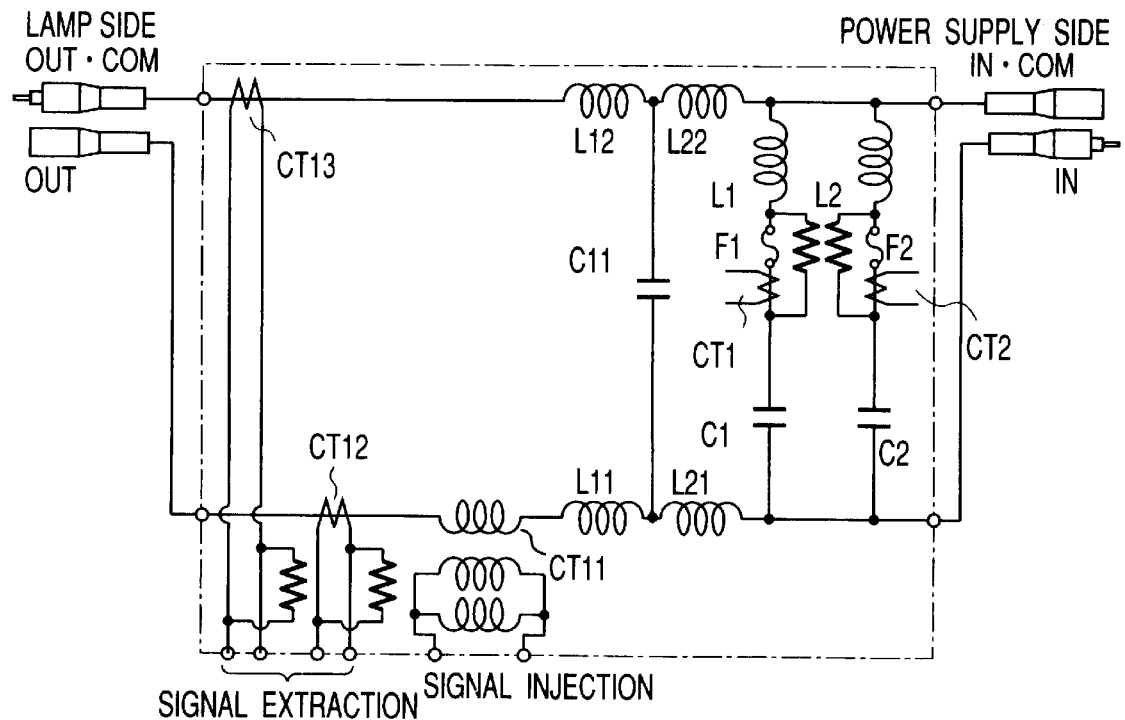
FIG. 23 is a configuration diagram illustrating the reception duplication at the host station.

To be more specific, as shown in FIG. 23, two compensation reactance elements L11, L12 are connected in series between the power source IN side line which is one end connection end side of an I type LC resonance circuit and the host station dedicated CT constituting the bypass filter apparatus 106, similarly, two compensation reactance elements L21, L22 are connected in series to the power source IN/COM side line which is the other one end connection end side of the I type LC resonance circuit, and further a compensation conductance element C11 is connected jumping between respective elements L11–L12 and elements L21–L22, and by installing a so-called H type distance prolongation compensation circuit 132, the distance of IN-OUT (F side), IN/COM-OUT/COM (R side) of the filter apparatus is increased apparently, to shift the reception point, shift the bottom due to phasing, and receive at a receivable level.

Further, the signal extraction section in the host station 108 extracts signal by a host station side CT serving as current sensor; however, the signal attenuation increases under the influence of the capacitance C between the power line and the earth, because the distance from the respective terminal 109 is far.

There, a host station dedicated CT which is signal extraction CT2, CT3 are installed at two points, power line primary side IN-OUT line, and IN/COM-OUT/COM line, the reception level of one point is lower and the reception level of the other point is made receivable by the reception duplication, so as to avoid the influence of reception level depression due to the attenuation amount.

Figure 24:
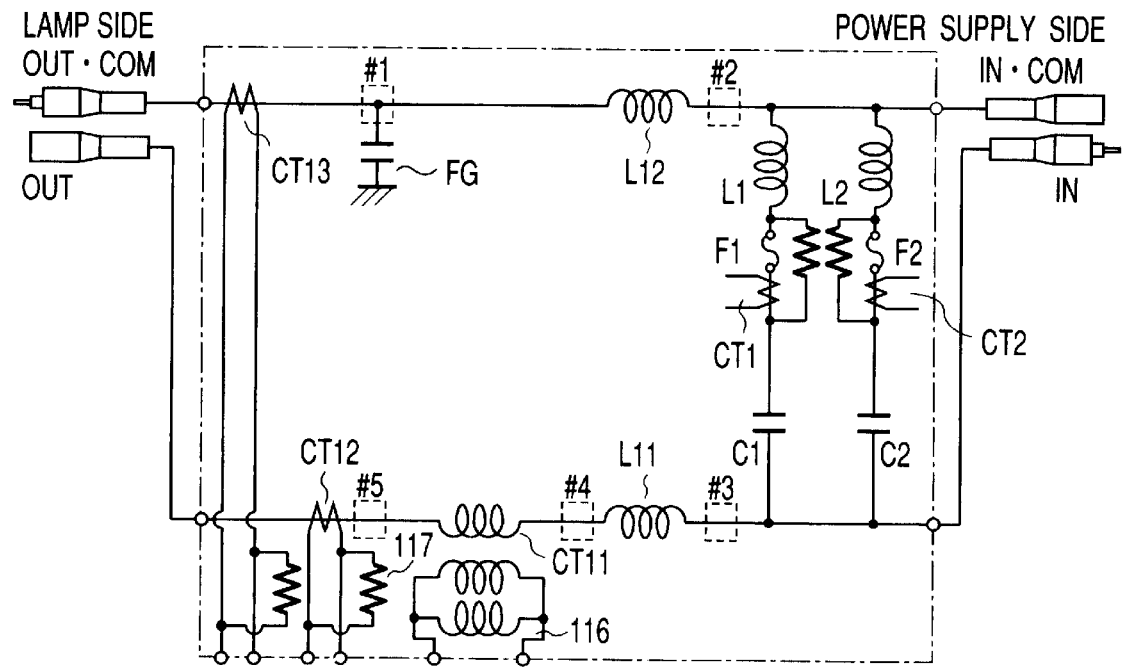
FIG. 24 is a diagram showing another example of compensation means for increasing the lamp side impedance.

In addition, as bypass filter apparatus, as shown in FIG. 24, a capacitor FG may be provided at any one of #1 to #5 in a circuit identical to FIG. 22.

Figure 25:
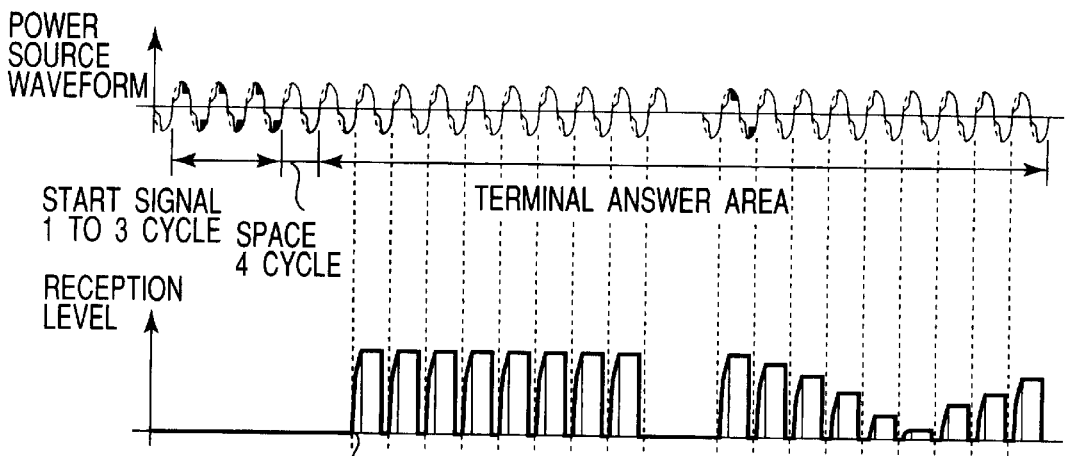
FIG. 25 is a state diagram of the reception level from respective terminals in the host station.
Figure 26:
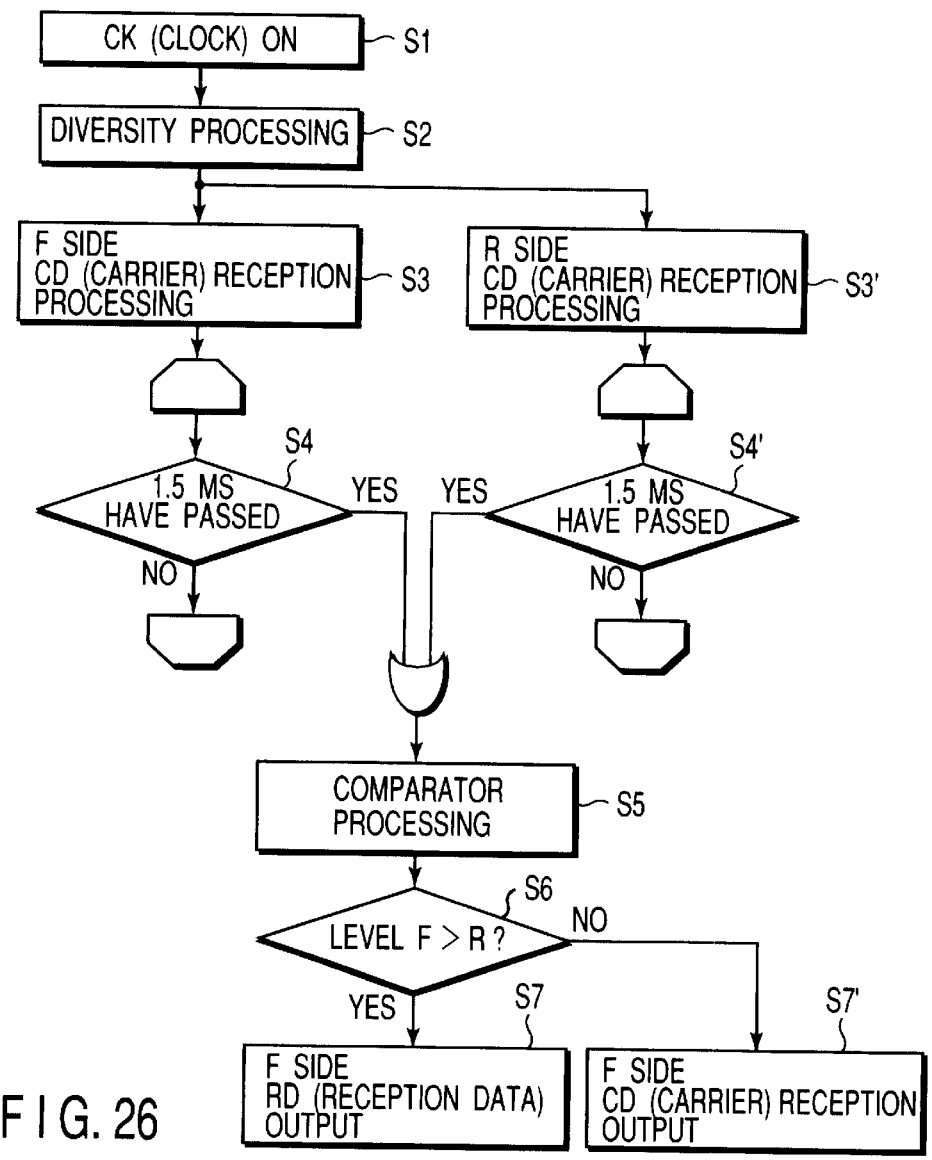
FIG. 26 is a processing flow chart of reception duplication the host station.

FIGS. 25 and 26 are diagrams illustrating the reception duplication at the host station.

The host station 8 synchronizes with the zero cross of power source waveform of the fixed current generator 104 based on a start signal, detects the zero cross for every half cycle/cycle of power source waveform from the start signal, and uses 1 to 4 cycle(s) as command from the host station 108+space, while the response period of respective terminal 109 to this command is allocated beforehand for each of respective power source cycle. At this time, the reception level from respective terminal 109 in the host station 108 is individually different.

There, the host station 108 receives a high level reception signal extracted from a reception system of high reception level, namely any of signal extraction CT2, CT3, through the reception duplication processing shown in FIG. 26, by monitoring the rise signal of respective terminal at all times. In short, the data processing calculation control section 111 in the host station 108 performs the diversity processing (S2) for taking in power-line carrier reception signals simultaneously from respective signal extraction sections corresponding to a plurality of Ct, CT2, based on the reception clock on by the zero cross detection of power source waveform (S1), performs the reception processing including filter processing of these taken in reception signals (S3, S3'), judges respectively whether for instance 1.5 ms (90 degrees from the zero cross of power source waveform) have passed or not (S4, S4'), compares F side level and R side level by the comparator processing of both reception signals when 1.5 ms have passed (S5, S6), takes in the signal extracted by the signal extraction section of F side signal if F side level is higher, and on the contrary takes in the signal extracted by the signal extraction section of R side signal if R side level is higher, and outputs the same (S7, S7').

Figure 27:
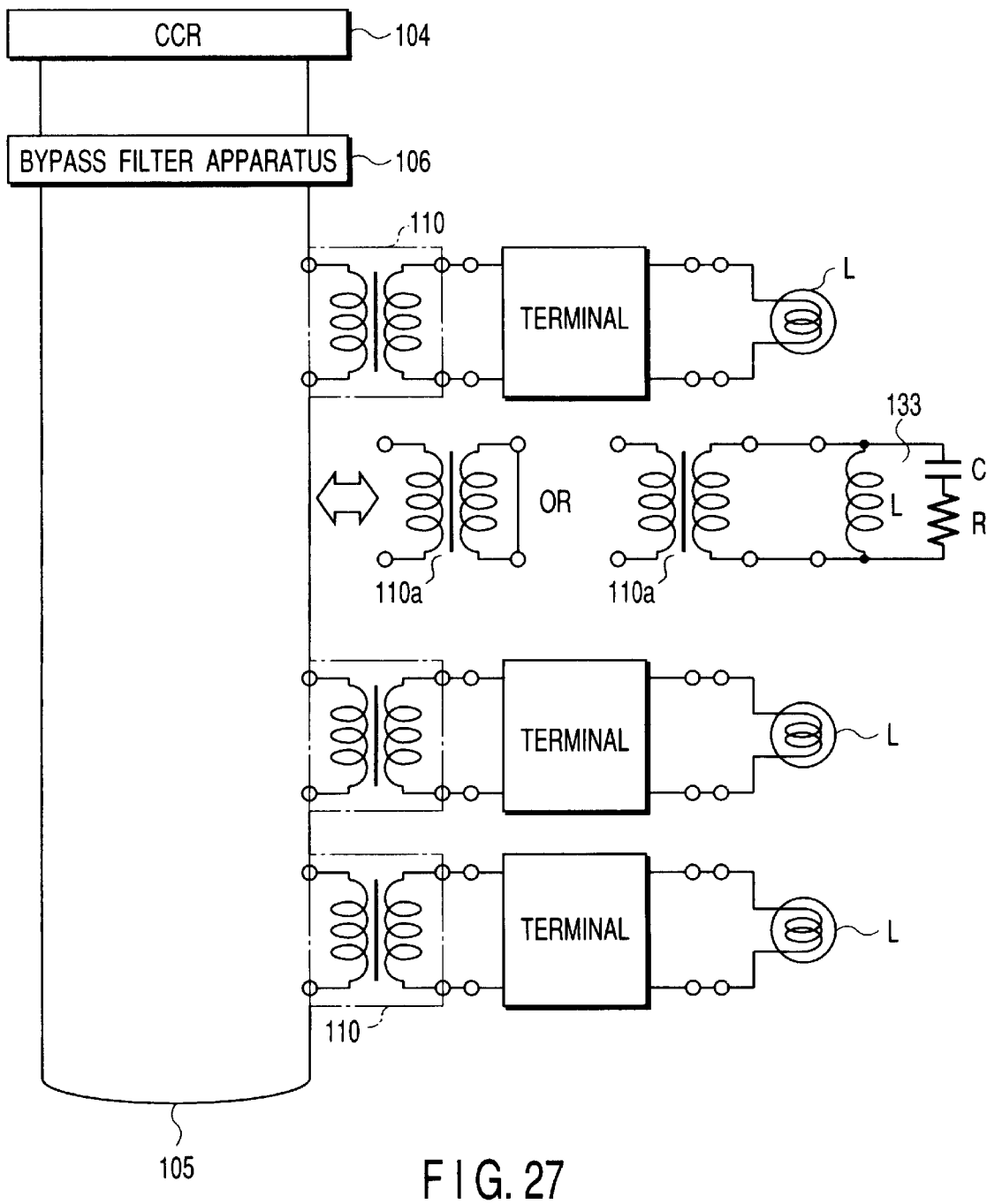
FIG. 27 is a configuration diagram compensating the reception level depression at the terminal.

On the other hand, in respective terminal 109 side, compensation means as shown in FIG. 27 is installed.

In other words, in the terminal 109, the influence of phasing is certainly low, some decrease of the reception level still exists. Especially, according to the lamp construction state of the power line 105, in the case where they are distant from the adjacent lamp, the signal is attenuated considerably under the influence of the capacitance between the power line—the earth.

There, as the reception become impossible at the terminal 109 connected to a place of the power line 105 where the reception level drops most, the reception level depression position is shifted by additionally inserting one rubber transformer 110a to the place, as shown in FIG. 27, allowing to receive the reception signal at the reception level of little depression in the concerned terminal 109.

Here, the secondary side of the added rubber transformer 110a is short-circuited, in the case when for instance a LC resonance circuit 133 resonating the frequency used for power-line carrier is connected, the reception level depression can be eliminated by resonating with the used frequency by the LC.

Figure 28:
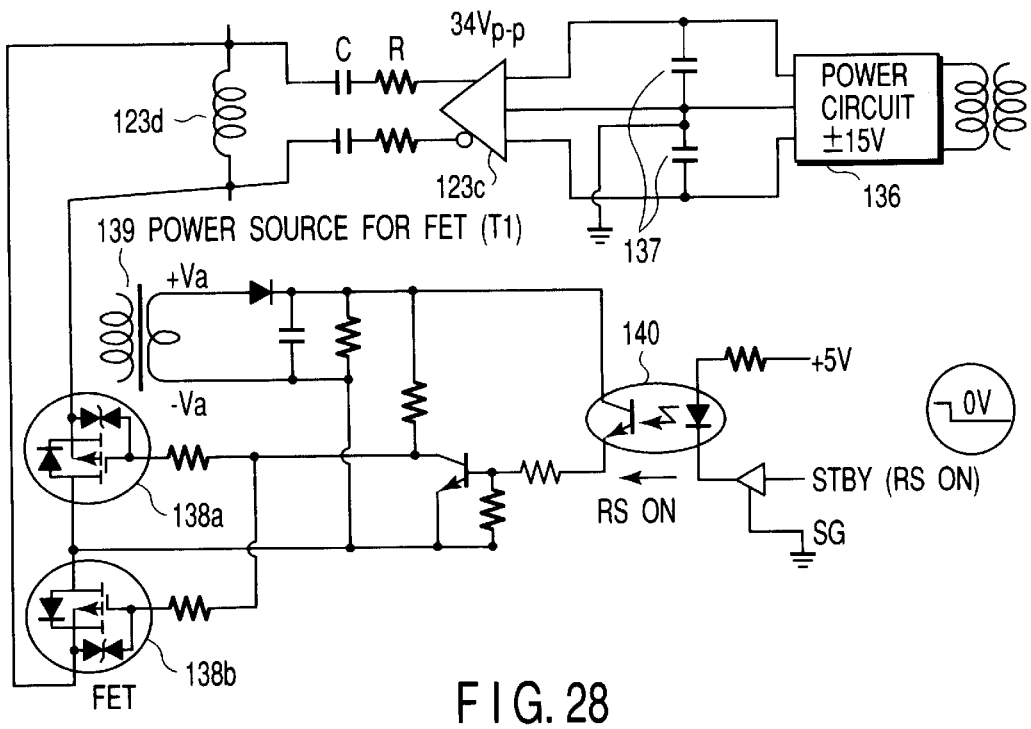
FIG. 28 is a configuration diagram showing an embodiment of power reduction out of signal transmission period of time at respective terminal.

FIG. 28 is a configuration diagram showing another embodiment of the signal injection section in respective terminal 109.

The higher the signal transmission level from respective terminal 109 is, the higher the communication quality is. There, in this configuration, a power source charge capacitor 137 is installed at the output side of the power source circuit 136 constituted as a part of the power line modem 123b, power necessary for the transmission is accumulated in the capacitor 137 per se during signal non transmission period, and for example a FSK modulated signal is transmitted consuming the accumulated power during the transmission.

On the other hand, the respective terminal 109 is connected to both ends of the signal injection reactance 123d respectively through FET138a, 138b as shown in FIG. 28, and so long as the signal injection reactance 123d is connected in series with the rubber transformer 110 even during the non-transmission period, power is consumed uselessly. Therefore, useless power consumption can be avoided by short-circuiting the both ends of the signal injection reactance 123d for instance by FET138a, 138b, during the non-transmission period. 139 is a FET power source, 140 control signal generation means for controlling ON/OFF of FET 138a, 138b.

Figure 29:
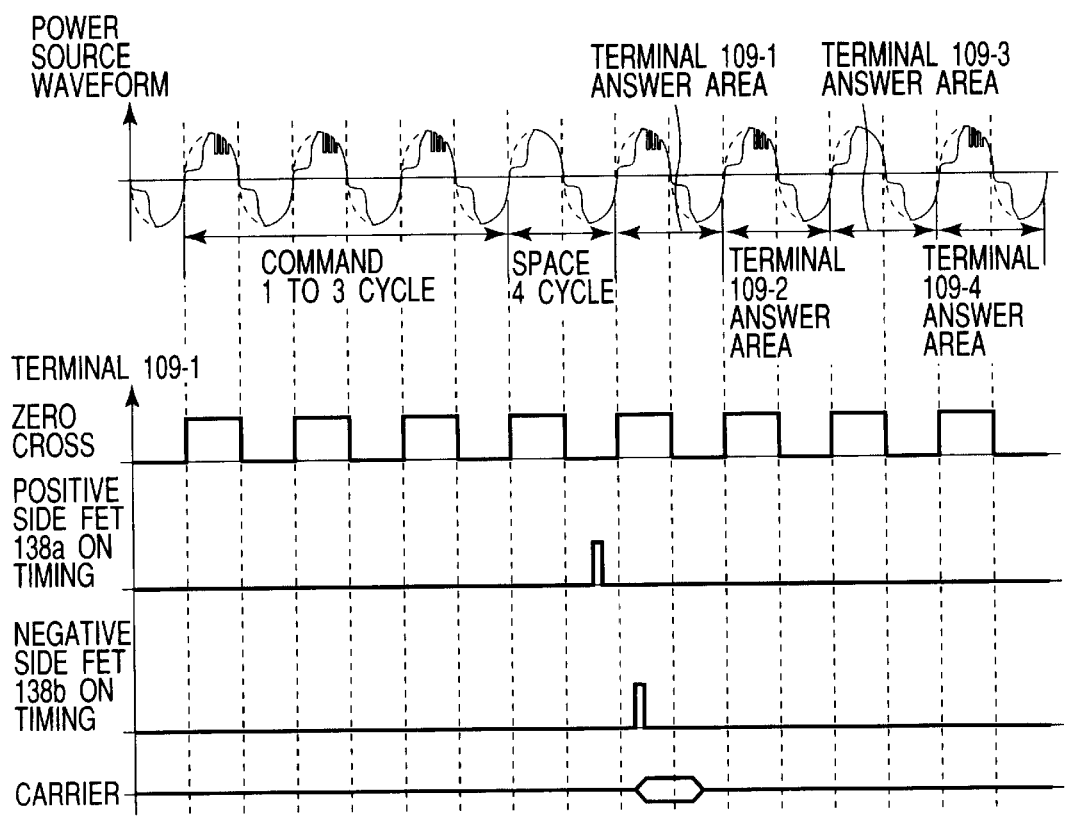
FIG. 29 illustrates the power reduction out of signal transmission period and the timing in the signal transmission period at respective terminal.

FIG. 29 illustrates the timing of FET 138a, 138b in the signal injection section 123 of respective terminal 109.

Namely, the host station 108 detects the zero cross of power source waveform, power-line carries command data to respective terminal 109 using 1 to 3 cycle(s), thereafter, after having installed a space of power source waveform 1 cycle, the answer period of respective terminal to this host station command is previously allocated for each respective power source cycle.

Here, in respect of the terminal 109-1, the positive side FET 138a is short-circuited on this side of the answer area of its own station, and the negative side FET 138b is short-circuited at the time point past the zero cross. By doing so, the generation of overvoltage at both ends of the reactance can be prevented beforehand by connecting suddenly a signal injection reactance 123d when the signal is injected.

As mentioned above, the present invention allows to reduce the influence of noise generated from the fixed current generator, ensure a high quality transmission, even for a power-line carrier of lower transmission quality, and further, realize the whole system at a low cost by using the power-line carrier.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An airport lamp monitor system comprising:
   a plurality of terminals connected in series to a power line derived from a fixed current generator, each of the terminals being connected to a lamp;
   a host station, connected to a higher order system and the power line, for transmitting a control signal to the terminals using a power-line carrier based on a signal from said higher order system; and
   a plurality of rubber transformers provided between the power line and the terminals, respectively,
   wherein said host station and each of the terminals comprise:
      a signal injection section for intermittently injecting said control signal and a lamp monitoring signal to said power line at a predetermined cycle within a predetermined time from the zero cross of a power source waveform of said power line;
      zero cross detection means for detecting the zero cross of power source waveform of the power line;
      noise and signal hold means for accumulating and holding the noise level and the signal level for a predetermined period within different predetermined time bands from the zero cross detection by said zero cross detection means; and
      signal presence/absence judgment means for detecting the difference between signal level and noise level held by said noise and signal hold means, judging the presence of a signal when the difference is equal or superior to a predetermined value, and receiving said control signal and lamp monitoring signal injected to the power line when it is judged that the signal exists.

2. The airport lamp monitor system according to claim 1, comprising a power accumulation element for accumulating power for the power source used for the lamp connected to respective terminal, wherein, power accumulated in this power accumulation element is used at least during the signal injection by said signal injection section.

3. The airport lamp monitor system according to claim 1, wherein a display element is connected between power lines derived from said fixed current generator through a bypass filter and a current transformer, and the flow state of output current of said fixed current generator is confirmed by the element.

4. An airport lamp monitor system comprising:

a plurality of terminals connected in series to a power line derived from a fixed current generator, each of the terminals being connected to a lamp;

a host station, connected to a higher order system and the power line, for transmitting a control signal to said terminals using a power-line carrier based on a signal from the higher order system; and a plurality of rubber transformers provided between the power line and said terminals, respectively, wherein said host station and each of the terminals comprise:

a signal injection section for intermittently injecting said control signal and a lamp monitoring signal to the power line at a predetermined cycle within a predetermined time from the zero cross of a power source waveform of the power line;

zero cross detection means for detecting the zero cross of power source waveform of the power line;

signal reception detection means for receiving said control signal and lamp monitoring signal injected to the power line based on a specific frequency component within a predetermined time from the zero cross detection by said zero cross detection means; and a filter apparatus comprising a LC resonance circuit which resonates the frequency used for the power-line carrier, and separating noise generated from the fixed current generator and a signal of the frequency used for the power-line carrier between said host station and each terminal, said filter apparatus being provided for the power line at the output side of the fixed current generator.

5. The airport lamp monitor system according to claim 4, wherein said filter apparatus comprises compensation reactance elements for increasing respectively said host station/respective terminal side impedance, installed at the power line primary side positioned at said host station/respective terminal side than said LC resonance circuit, in order to lower the attenuation slope of the frequency used for power-line carrier due to phasing or standing wave and to increase the reception level.

6. The airport lamp monitor system according to claim 4, wherein said host stations comprises a plurality of signal extraction sensors installed at the power line primary side positioned at said host station/respective terminal side than said LC resonance circuit in said bypass filter apparatus so as to take in as reception signal the signal extraction sensor side extraction signal presenting a higher reception level.

7. The airport lamp monitor system according to claim 4, wherein an additional rubber transformer is connected to said power line on this side of a specific terminal presenting a deeper depression of reception level, among terminals connected to said power line, in order to avoid the reception level depression at said specific terminal.

8. The airport lamp monitor system according to claim 4, wherein an additional rubber transformer is connected to said power line on this side of a specific terminal presenting a deeper depression of reception level, among terminals connected to said power line, and a resonance circuit resonating with the frequency used for the power-line carrier at the secondary side of the connected additional rubber transformer is provided so as to avoid the reception level depression at said specific terminal.

9. The airport lamp monitor system according to claim 8, wherein said switching element connects said signal injection reactance before a predetermined time of the power source waveform to inject signal so as to avoid the generation of overvoltage by the signal injection reactance.

10. The airport lamp monitor system according to claim 4, wherein said terminal is provided with a power charging capacitor for charging power to the output side of the power line modem out of signal injection period, when signal is injected to said power line from the power line modem through a signal injection reactance, and a switching element for short-circuiting said signal injection reactance during said non signal injection period so as to increase the transmission power using said charged power during signal injection.

* * * * *

UNITED STATES PATENT AND TRADEMARK OFFICE
CERTIFICATE OF CORRECTION

PATENT NO. : 6,483,314 B2
DATED : November 19, 2002
INVENTOR(S) : Satoh et al.

It is certified that error appears in the above-identified patent and that said Letters Patent is hereby corrected as shown below:

Column 18,
Line 9, change "host stations" to -- host station --.

Signed and Sealed this

Fifteenth Day of April, 2003

JAMES E. ROGAN
*Director of the United States Patent and Trademark Office*